(12) United States Patent
Yoo et al.

(10) Patent No.: US 9,959,035 B2
(45) Date of Patent: May 1, 2018

(54) ELECTRONIC DEVICE HAVING SIDE-SURFACE TOUCH SENSORS FOR RECEIVING THE USER-COMMAND

(71) Applicant: SAMSUNG DISPLAY CO., LTD., Yongin, Gyeonggi-Do (KR)

(72) Inventors: Hee-Soo Yoo, Seoul (KR); Mu-Gyeom Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 527 days.

(21) Appl. No.: 14/309,852

(22) Filed: Jun. 19, 2014

(65) Prior Publication Data
US 2015/0186030 A1 Jul. 2, 2015

(30) Foreign Application Priority Data
Dec. 27, 2013 (KR) ........................ 10-2013-0164933

(51) Int. Cl.
| | |
|---|---|
| *G06F 3/048* | (2013.01) |
| *G06F 3/041* | (2006.01) |
| *G06F 3/00* | (2006.01) |
| *G06F 3/0488* | (2013.01) |
| *G04G 21/08* | (2010.01) |
| *G06F 1/16* | (2006.01) |
| *G06F 3/0484* | (2013.01) |

(Continued)

(52) U.S. Cl.
CPC ......... *G06F 3/04883* (2013.01); *G04G 21/08* (2013.01); *G06F 1/163* (2013.01); *G06F 1/169* (2013.01); *G06F 1/1643* (2013.01); *G06F 3/0412* (2013.01); *G06F 3/0418* (2013.01); *G06F 3/0486* (2013.01); *G06F 3/04812* (2013.01); *G06F 3/04842* (2013.01); *G06F 2203/0339* (2013.01); *G06F 2203/04803* (2013.01); *G06F 2203/04806* (2013.01); *G06F 2203/04808* (2013.01)

(58) Field of Classification Search
CPC ............. G06F 3/048; G06F 3/041; G06F 3/00
See application file for complete search history.

(56) References Cited

U.S. PATENT DOCUMENTS

| | | | | |
|---|---|---|---|---|
| 6,310,631 | B1 * | 10/2001 | Cecco ................... | G06F 3/0481 715/792 |
| 2003/0142081 | A1 | 7/2003 | Iisuku et al. | |

(Continued)

FOREIGN PATENT DOCUMENTS

| | | |
|---|---|---|
| EP | 2 393 000 A2 | 12/2011 |
| JP | 2007-200002 | 8/2007 |

(Continued)

*Primary Examiner* — Hugo Molina
(74) *Attorney, Agent, or Firm* — Lewis Roca Rothgerber Christie LLP

(57) ABSTRACT

An electronic device includes a front-surface touch screen, a plurality of side-surface touch sensors that receive a user-command, and a body that includes a processor for processing the user-command, where the body is combined with the front-surface touch screen and the side-surface touch sensors. Here, the user-command includes an operation in which at least one of the side-surface touch sensors is touched by a user for more than an activation time and an operation in which a touched point of the at least one of the side-surface touch sensors is moved by the user.

8 Claims, 25 Drawing Sheets

(51) Int. Cl.
*G06F 3/0481* (2013.01)
*G06F 3/0486* (2013.01)

(56) References Cited

U.S. PATENT DOCUMENTS

| | | | |
|---|---|---|---|
| 2006/0020903 A1* | 1/2006 | Wang | G06F 3/0481 |
| | | | 715/792 |
| 2008/0291225 A1 | 11/2008 | Arneson | |
| 2009/0249235 A1 | 10/2009 | Kim et al. | |
| 2009/0288043 A1* | 11/2009 | Willis | G06F 3/0488 |
| | | | 715/859 |
| 2010/0079395 A1* | 4/2010 | Kim | G06F 1/1626 |
| | | | 345/173 |
| 2010/0177049 A1* | 7/2010 | Levy | G06F 3/0488 |
| | | | 345/173 |
| 2010/0287470 A1* | 11/2010 | Homma | G06F 3/03547 |
| | | | 715/702 |
| 2011/0035701 A1* | 2/2011 | Williams | G06F 3/0481 |
| | | | 715/784 |
| 2011/0057957 A1 | 3/2011 | Kasahara | |
| 2011/0087963 A1 | 4/2011 | Brisebois et al. | |
| 2011/0105187 A1* | 5/2011 | Dobroth | G06F 3/0481 |
| | | | 455/566 |
| 2011/0109587 A1* | 5/2011 | Ferencz | G06F 3/03547 |
| | | | 345/174 |
| 2011/0122085 A1 | 5/2011 | Chang | |
| 2011/0157020 A1 | 6/2011 | Huang et al. | |
| 2011/0157046 A1* | 6/2011 | Lee | G04G 21/08 |
| | | | 345/173 |
| 2011/0187660 A1* | 8/2011 | Hirata | G06F 3/03547 |
| | | | 345/173 |
| 2011/0300910 A1 | 12/2011 | Choi | |
| 2012/0054671 A1 | 3/2012 | Thompson et al. | |
| 2012/0162358 A1 | 6/2012 | Choi | |
| 2012/0200603 A1* | 8/2012 | Backer | G06F 3/0488 |
| | | | 345/650 |
| 2012/0218207 A1 | 8/2012 | Sato et al. | |
| 2012/0256829 A1 | 10/2012 | Dodge | |
| 2013/0009890 A1 | 1/2013 | Kwon | |
| 2013/0021273 A1 | 1/2013 | Lee et al. | |
| 2013/0057472 A1* | 3/2013 | Dizac | G06F 3/0346 |
| | | | 345/163 |
| 2013/0091447 A1 | 4/2013 | Kang | |
| 2013/0100044 A1* | 4/2013 | Zhao | G06F 1/1694 |
| | | | 345/173 |
| 2013/0205210 A1* | 8/2013 | Jeon | G06F 3/04883 |
| | | | 715/716 |
| 2014/0078086 A1* | 3/2014 | Bledsoe | G06F 3/041 |
| | | | 345/173 |
| 2014/0181750 A1* | 6/2014 | Fujiwara | G06F 3/04817 |
| | | | 715/835 |
| 2014/0327626 A1* | 11/2014 | Harrison | G06F 3/0416 |
| | | | 345/173 |
| 2015/0135145 A1* | 5/2015 | Kamide | G06F 3/0488 |
| | | | 715/863 |

FOREIGN PATENT DOCUMENTS

| | | |
|---|---|---|
| JP | 2010-231653 | 10/2010 |
| JP | 2011-120090 | 6/2011 |
| JP | 2012-530320 A | 11/2012 |
| JP | 2013-84232 A | 5/2013 |
| KR | 10-2009-0102108 A | 9/2009 |
| KR | 10-0938158 B1 | 1/2010 |
| KR | 10-2010-0042833 A | 4/2010 |
| KR | 10-2010-0058250 A | 6/2010 |
| KR | 10-2010-0121183 A | 11/2010 |
| KR | 10-2010-0138579 A | 12/2010 |
| KR | 10-2011-0050248 A | 5/2011 |
| KR | 10-2011-0068666 A | 6/2011 |
| KR | 10-2012-0007384 A | 1/2012 |
| KR | 10-2012-0010056 A | 2/2012 |
| KR | 10-2012-0089919 A | 8/2012 |
| KR | 10-2012-0135977 A | 12/2012 |
| KR | 10-2013-0036953 A | 4/2013 |
| KR | 10-2013-0045744 A | 5/2013 |
| KR | 10-2013-0053735 A | 5/2013 |
| KR | 10-2013-0059123 A | 6/2013 |
| KR | 10-1292719 B1 | 8/2013 |

* cited by examiner

ELECTRONIC DEVICE HAVING SIDE-SURFACE TOUCH SENSORS FOR RECEIVING THE USER-COMMAND

CROSS-REFERENCE TO RELATED APPLICATION

This application claims priority to and the benefit of Korean Patent Application No. 10-2013-0164933, filed on Dec. 27, 2013, in the Korean Intellectual Property Office (KIPO), the content of which is incorporated herein in its entirety by reference.

BACKGROUND

1. Field

Example embodiments relate generally to an electronic device. More particularly, embodiments of the present inventive concept relate to an electronic device including a touch screen.

2. Description of the Related Art

Recently, electronic devices including a touch screen (e.g., a mobile device such as a cellular phone, a smart phone, a smart pad, etc.) are widely used. In addition, an interest in a watch-shaped mobile device (e.g., referred to as a smart watch) increases, where the smart watch interworks with the mobile device, or independently performs a function of the mobile device. However, since a user wears the watch-shaped mobile device on a wrist, the size of a front-surface touch screen included in the watch-shaped mobile device has limits, unlike the mobile device such as the cellular phone, the smart phone, the smart pad, etc. Generally, compared to a front-surface touch screen included in the mobile device such as the cellular phone, the smart phone, the smart pad, etc., the front-surface touch screen included in the watch-shaped mobile device has a relatively small size (e.g., about 1.3 inches). Thus, when a conventional method in which a user inputs a user-command by touching and/or dragging on the front-surface touch screen of the mobile device is employed in the watch-shaped mobile device, the user-command may not be accurately and precisely input to the mobile device. As a result, the user-command may be erroneously input to the mobile device.

SUMMARY

Some example embodiments provide an electronic device capable of allowing a user to accurately and precisely input a user-command to the electronic device although the electronic device includes a front-surface touch screen having a relatively small size.

According to some example embodiments, an electronic device may include a front-surface touch screen; a plurality of side-surface touch sensors configured to receive a user-command; and a body including a processor for processing the user-command, wherein the body is combined with the front-surface touch screen and the side-surface touch sensors. Here, the user-command may include an operation in which at least one of the side-surface touch sensors is touched by a user for more than an activation time, and an operation in which a touched point of the at least one of the side-surface touch sensors is moved by the user.

In example embodiments, the side-surface touch sensors may include a left side-surface touch sensor, a right side-surface touch sensor, an upper side-surface touch sensor, and a lower side-surface touch sensor with respect to a center of the body.

In example embodiments, the electronic device may correspond to a watch-shaped mobile device that the user wears on a wrist.

In example embodiments, a first pointer line extended from a first touched point of the left side-surface touch sensor or the right side-surface touch sensor, and a second pointer line extended from a second touched point of the upper side-surface touch sensor or the lower side-surface touch sensor may be displayed on the front-surface touch screen when one of the left side-surface touch sensor and the right side-surface touch sensor, and one of the upper side-surface touch sensor and the lower side-surface touch sensor are concurrently touched by the user for more than the activation time. In addition, a pointer may be displayed at a crossing point of the first pointer line and the second pointer line on the front-surface touch screen.

In example embodiments, the pointer, the first pointer line, and the second pointer line may be moved on the front-surface touch screen as the first touched point and the second touched point are moved by the user. In addition, the pointer, the first pointer line, and the second pointer line may disappear from the front-surface touch screen when a deactivation time elapses after the first touched point and the second touched point have been moved by the user.

In example embodiments, the processor may perform a click operation on contents at which the pointer points when the front-surface touch screen is touched by the user while the pointer, the first pointer line, and the second pointer line are displayed on the front-surface touch screen.

In example embodiments, the processor may perform a first click operation on the contents when a first region of the front-surface touch screen is touched by the user while the pointer, the first pointer line, and the second pointer line are displayed on the front-surface touch screen, wherein the first region is a region within a reference distance from the pointer. In addition, the processor may perform a second click operation on the contents when a second region of the front-surface touch screen is touched by the user while the pointer, the first pointer line, and the second pointer line are displayed on the front-surface touch screen, wherein the second region is a region outside the reference distance from the pointer.

In example embodiments, the first click operation may correspond to a left click operation of a computer mouse device, and the second click operation may correspond to a right click operation of the computer mouse device.

In example embodiments, the processor may perform a drag operation on the contents when, the side-surface touch sensors are touched again by the user within a reactivation time after touches on the side-surface touch sensors are released by the user, and the first touched point and the second touched point are moved while the pointer, the first pointer line, and the second pointer line are displayed on the front-surface touch screen.

In example embodiments, the reactivation time may be shorter than the activation time.

In example embodiments, a first division line coupled between a first touched point of the left side-surface touch sensor and a second touched point of the right side-surface touch sensor may be displayed on the front-surface touch screen when the left side-surface touch sensor and the right side-surface touch sensor are concurrently touched by the user for more than the activation time.

In example embodiments, a second division line coupled between a third touched point of the upper side-surface touch sensor and a fourth touched point of the lower side-surface touch sensor may be displayed on the front-surface touch screen when the upper side-surface touch sensor and the lower side-surface touch sensor are concurrently touched by the user for more than the activation time.

In example embodiments, the first division line may be moved on the front-surface touch screen as the first touched point and the second touched point are moved by the user. In addition, the second division line may be moved on the front-surface touch screen as the third touched point and the fourth touched point are moved by the user.

In example embodiments, a display region of the front-surface touch screen may be divided into an upper display region and a lower display region by the first division line, and may be divided into a left display region and a right display region by the second division line.

In example embodiments, the first division line may disappear from the front-surface touch screen when a deactivation time elapses after the first touched point and the second touched point have been moved by the user. In addition, the second division line may disappear from the front-surface touch screen when the deactivation time elapses after the third touched point and the fourth touched point have been moved by the user.

In example embodiments, the first division line may be displayed again on the front-surface touch screen when the left side-surface touch sensor and the right side-surface touch sensor are concurrently touched by the user for more than the activation time while the display region of the front-surface touch screen is divided into the upper display region and the lower display region. In addition, the upper display region and the lower display region may be relatively adjusted as the first touched point and the second touched point are moved by the user.

In example embodiments, the second division line may be displayed again on the front-surface touch screen when the upper side-surface touch sensor and the lower side-surface touch sensor are concurrently touched by the user for more than the activation time while the display region of the front-surface touch screen is divided into the left display region and the right display region. In addition, the left display region and the right display region may be relatively adjusted as the third touched point and the fourth touched point are moved by the user.

In example embodiments, the first division line or the second division line may be partially displayed again on the front-surface touch screen when the left side-surface touch sensor, the right side-surface touch sensor, the upper side-surface touch sensor, or the lower side-surface touch sensor is touched by the user for more than the activation time while the display region of the front-surface touch screen is divided into the left display region, the right display region, the upper display region, and the lower display region. In addition, the left and right display regions or the upper and lower display regions may be relatively adjusted as the first touched point, the second touched point, the third touched point, or the fourth touched point is moved by the user.

In example embodiments, the first division line or the second division line may be displayed again on the front-surface touch screen when the left side-surface touch sensor and the right side-surface touch sensor are concurrently touched in a staggered manner by the user for more than the activation time, or when the upper side-surface touch sensor and the lower side-surface touch sensor are concurrently touched in a staggered manner by the user for more than the activation time while the display region of the front-surface touch screen is divided into the left display region, the right display region, the upper display region, and the lower display region. In addition, the left display region, the right display region, the upper display region, and the lower display region may be rotated about a crossing point of the first division line and the second division line as the first touched point, the second touched point, the third touched point, or the fourth touched point is moved by the user.

In example embodiments, a target display region may be determined when one of the left display region, the right display region, the upper display region, and the lower display region is touched by the user after one of the left side-surface touch sensor and the right side-surface touch sensor, and one of the upper side-surface touch sensor and the lower side-surface touch sensor are concurrently touched by the user for more than the activation time while the display region of the front-surface touch screen is divided into the left display region, the right display region, the upper display region, and the lower display region. In addition, the target display region may be zoomed-in or zoomed-out as the first touched point, the second touched point, the third touched point, or the fourth touched point is moved by the user.

Therefore, an electronic device according to example embodiments, where the electronic device includes a plurality of side-surface touch sensors for receiving a user-command, may allow a user to accurately and precisely input the user-command to the electronic device because the electronic device receives the user-command based on an operation in which at least one of the side-surface touch sensors is touched by the user for more than an activation time and an operation in which a touched point of respective side-surface touch sensors is dragged (e.g., moved) by the user.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Hereinafter, embodiments of the present inventive concept will be explained in more detail with reference to the accompanying drawings.

Figure 1:
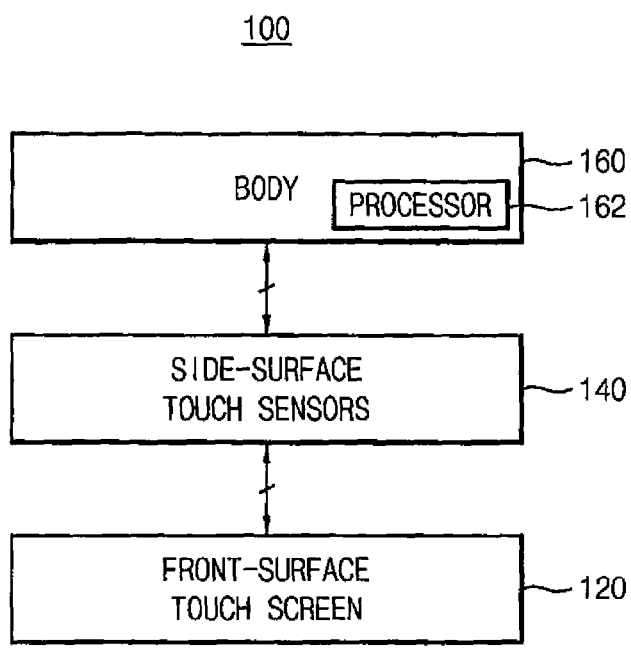
FIG. 1 is a block diagram illustrating an electronic device according to example embodiments.
Figure 2:
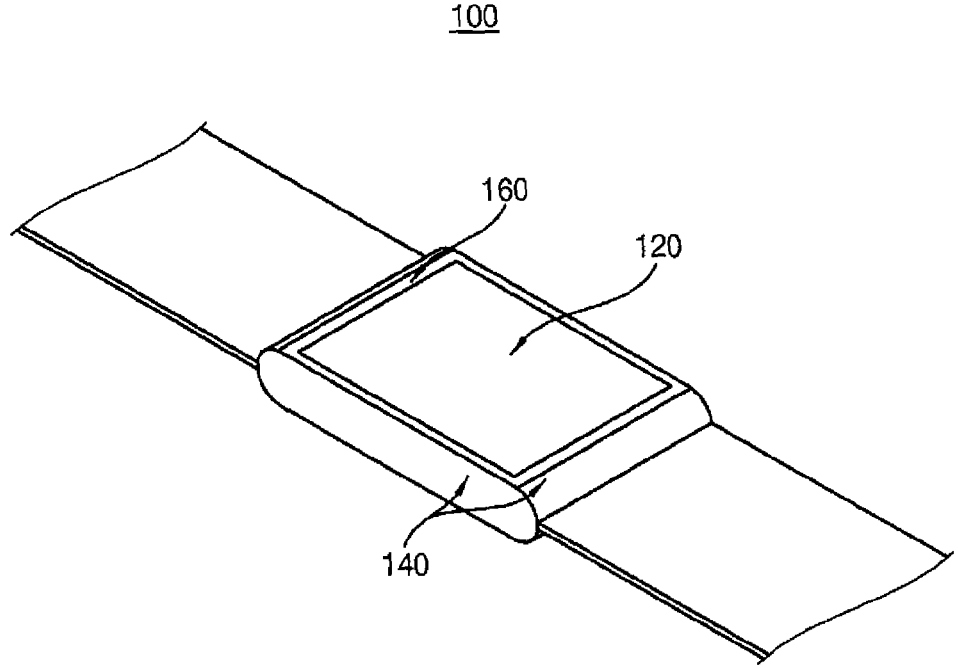
FIG. 2 is a diagram illustrating an example in which the electronic device of FIG. 1 is implemented as a watch-shaped mobile device.
Figure 3:
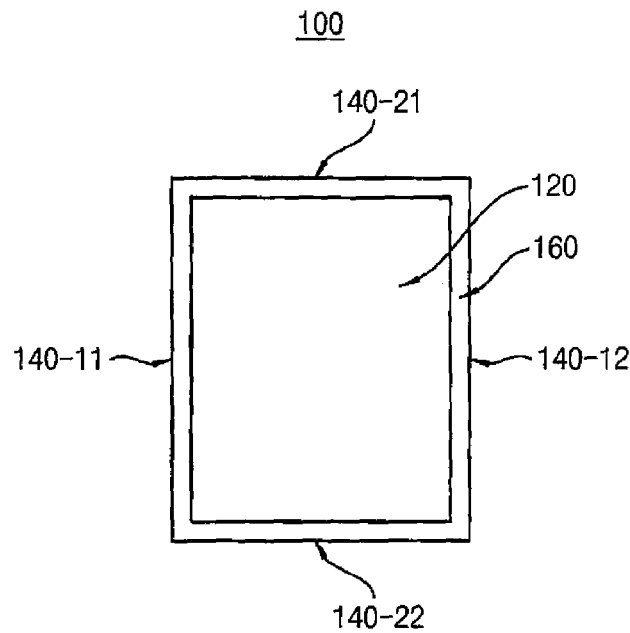
FIG. 3 is a diagram illustrating a front-surface touch screen, a plurality of side-surface touch sensors, and body included in the electronic device of FIG. 1.

FIG. 1 is a block diagram illustrating an electronic device according to example embodiments. FIG. 2 is a diagram illustrating an example in which the electronic device of FIG. 1 is implemented as a watch-shaped mobile device. FIG. 3 is a diagram illustrating a front-surface touch screen, a plurality of side-surface touch sensors, and a body included in the electronic device of FIG. 1.

Referring to FIGS. 1 through 3, the electronic device 100 may include a front-surface touch screen 120, a plurality of side-surface touch sensors 140, and a body 160. The front-surface touch screen 120 and the side-surface touch sensors 140 may be combined with the body 160. In some example embodiments, as illustrated in FIG. 2, the electronic device 100 may be a watch-shaped mobile device that a user wears on the wrist (e.g., referred to as a smart watch).

The front-surface touch screen 120 may perform a display function and a touch sensor function. Here, the front-surface touch screen 120 may include a display panel for performing the display function and a touch sensing panel for performing the touch sensor function. In some example embodiments, the front-surface touch screen 120 may be a flexible touch screen. When the electronic device 100 corresponds to the watch-shaped mobile device that interworks with a mobile device such as a cellular phone, a smart phone, a smart pad, etc., or independently performs a function of the mobile device, the front-surface touch screen 120 included in the electronic device 100 may have a relatively small size (e.g., about 1.3 inches) compared to a front-surface touch screen included in the mobile device such as the cellular phone, the smart phone, the smart pad, etc., because the user wears the electronic device 100 (e.g., watch-shaped mobile device) on the wrist. Thus, the electronic device 100 may not depend on a conventional (comparable) method in which a user inputs a user-command by touching and/or dragging on a front-surface touch screen. That is, the electronic device 100 may receive the user-command by mainly using (or utilizing) the side-surface touch sensors 140. Hereinafter, it will be described that the electronic device 100 receives the user-command by using (or utilizing) the side-surface touch sensors 140. However, the present inventive concept does not exclude the conventional method in which the electronic device 100 receives the user-command by using (or utilizing) the front-surface touch screen 120. For example, the electronic device 100 may receive the user-command by using (or utilizing) the front-surface touch screen 120 as well as by using (or utilizing) the side-surface touch sensors 140.

As described above, the side-surface touch sensors 140 included in the electronic device 100 may receive the user-command. For example, as illustrated in FIG. 3, the side-surface touch sensors 140 may include a left side-surface touch sensor 140-11, a right side-surface touch sensor 140-12, an upper side-surface touch sensor 140-21, and a lower side-surface touch sensor 140-22 with respect to a center of the body 160. In some example embodiments, the side-surface touch sensors 140 may include one of the left side-surface touch sensor 140-11 and the right side-surface touch sensor 140-12, and one of the upper side-surface touch sensor 140-21 and the lower side-surface touch sensor 140-22. In other words, the side-surface touch sensors 140 may include one or more of the left side-surface touch sensor 140-11, the right side-surface touch sensor 140-12, the upper side-surface touch sensor 140-21, and the lower side-surface touch sensor 140-22 with respect to a center of the body 160. The user-command may include an operation in which at least one of the side-surface touch sensors 140 is touched by the user for more than an activation time (e.g., a set or predetermined activation time), and an operation in which a touched point of respective side-surface touch sensors 140 is dragged (e.g., moved) by the user. That is, the user may input the user-command to the electronic device 100 by touching at least one of the side-surface touch sensors 140 for more than the activation time (e.g., the set or predetermined activation time at a respective touched point), and by dragging (e.g., moving) the touched point of the respective side-surface touch sensors 140. Here, the user-command may be processed by a processor 162 included in the body 160.

In an example embodiment, when one of the left side-surface touch sensor 140-11 and the right side-surface touch sensor 140-12, and one of the upper side-surface touch sensor 140-21 and the lower side-surface touch sensor 140-22 are concurrently touched by the user for more than the activation time, a first pointer line extended from a first touched point of the left side-surface touch sensor 140-11 or the right side-surface touch sensor 140-12, and a second pointer line extended from a second touched point of the upper side-surface touch sensor 140-21 or the lower side-surface touch sensor 140-22 may be displayed on the front-surface touch screen 120. Here, a pointer may be displayed at a crossing point of the first pointer line and the second pointer line. For example, when the right side-surface touch sensor 140-12 and the lower side-surface touch sensor 140-22 are concurrently touched by the user for more than the activation time, the first pointer line extended from the first touched point of the right side-surface touch sensor 140-12 and the second pointer line extended from the second touched point of the lower side-surface touch sensor 140-22 may be displayed on the front-surface touch screen 120. In addition, the pointer may be displayed at the crossing point of the first pointer line and the second pointer line. Further, the first pointer line and the second pointer line may be perpendicular to each other. However, the present inventive concept is not limited to the above example. That is, the right side-surface touch sensor 140-12 and the upper side-surface touch sensor 140-21 may be concurrently touched by the user, the left side-surface touch sensor 140-11 and the lower side-surface touch sensor 140-22 may be concurrently touched by the user, or the left side-surface touch sensor 140-11 and the upper side-surface touch sensor 140-21 may be concurrently touched by the user.

As described above, when one of the left side-surface touch sensor 140-11 and the right side-surface touch sensor 140-12, and one of the upper side-surface touch sensor 140-21 and the lower side-surface touch sensor 140-22 are touched by the user for more than the activation time, the pointer, the first pointer line, and the second pointer line may be displayed on the front-surface touch screen 120. Subsequently, as the first touched point of the left side-surface touch sensor 140-11 or the right side-surface touch sensor 140-12, and the second touched point of the upper side-surface touch sensor 140-21 or the lower side-surface touch sensor 140-22 are dragged (e.g., moved) by the user, the first pointer line extended from the first touched point of the left side-surface touch sensor 140-11 or the right side-surface touch sensor 140-12, the second pointer line extended from the second touched point of the upper side-surface touch sensor 140-21 or the lower side-surface touch sensor 140-22, and the pointer displayed at the crossing point of the first pointer line and the second pointer line may be moved. Hence, the user may move a touched point of respective side-surface touch sensors 140 by dragging the touched point of respective side-surface touch sensors 140 (e.g., by dragging the first touched point of the left side-surface touch sensor 140-11 or the right side-surface touch sensor 140-12, and the second touched point of the upper side-surface touch sensor 140-21 or the lower side-surface touch sensor 140-22) while watching the pointer, the first pointer line, and the second pointer line that are displayed on the front-surface touch screen 120.

While the pointer, the first pointer line, and the second pointer line are displayed on the front-surface touch screen 120, the processor 162 of the body 160 may perform a click operation on contents (e.g., icon, text, etc.) at which the pointer points when the front-surface touch screen 120 is touched by the user. For example, while the pointer, the first pointer line, and the second pointer line are displayed on the front-surface touch screen 120, the processor 162 of the body 160 may perform a first click operation on the contents when a first region of the front-surface touch screen 120 is touched by the user, where the first region is a region within a reference distance (e.g., a set or predetermined distance) from the pointer. On the other hand, while the pointer, the first pointer line, and the second pointer line are displayed on the front-surface touch screen 120, the processor 162 of the body 160 may perform a second click operation on the contents when a second region of the front-surface touch screen 120 is touched by the user, where the second region is a region outside the reference distance (e.g., the set or predetermined distance) from the pointer. For example, the first click operation may correspond to a left click operation of a computer mouse device, and the second click operation may correspond to a right click operation of the computer mouse device. However, since these are examples, a way of performing the first click operation and the second click operation, a function of the first click operation and the second click operation, etc. may be determined in various ways. For example, the first click operation may correspond to the right click operation of the computer mouse device, and the second click operation may correspond to the left click operation of the computer mouse device. In some example embodiments, the pointer, the first pointer line, and the second pointer line may not be displayed on the front-surface touch screen 120 when a deactivation time (e.g., a set or predetermined deactivation time) elapses after the first touched point of the left side-surface touch sensor 140-11 or the right side-surface touch sensor 140-12, and the second touched point of the upper side-surface touch sensor 140-21 or the lower side-surface touch sensor 140-22 have been moved by the user. In other words, the pointer, the first pointer line, and the second pointer line may disappear from the front-surface touch screen 120.

In another example embodiment, while the pointer, the first pointer line, and the second pointer line are displayed on the front-surface touch screen 120, touches on the side-surface touch sensors 140 may be released by the user, and then one of the left side-surface touch sensor 140-11 and the right side-surface touch sensor 140-12, and one of the upper side-surface touch sensor 140-21 and the lower side-surface touch sensor 140-22 may be touched again by the user within a reactivation time (e.g., a set or predetermined reactivation time). Subsequently, when the first touched point of the left side-surface touch sensor 140-11 or the right side-surface touch sensor 140-12, and the second touched point of the upper side-surface touch sensor 140-21 or the lower side-surface touch sensor 140-22 are moved by the user, the processor 162 of the body 160 may set (or, determine) a drag region based on a moving distance of the first touched point of the left side-surface touch sensor 140-11 or the right side-surface touch sensor 140-12, and a moving distance of the second touched point of the upper side-surface touch sensor 140-21 or the lower side-surface touch sensor 140-22. That is, the processor 162 of the body 160 may perform a drag operation on the contents. For example, the drag region may be a quadrangular region, where one side of the quadrangular region corresponds to the moving distance of the first touched point of the left side-surface touch sensor 140-11 or the right side-surface touch sensor 140-12, and another side of the quadrangular region corresponds to the moving distance of the second touched point of the upper side-surface touch sensor 140-21 or the lower side-surface touch sensor 140-22. In some example embodiments, the reactivation time (e.g., a set or predetermined reactivation time) may be set to be shorter than the activation time. In other example embodiments, the reactivation time may be set to be longer than the activation time, or to be equal to the activation time.

In still another example embodiment, when the left side-surface touch sensor 140-11 and the right side-surface touch sensor 140-12 are concurrently touched by the user for more than the activation time, a first division line coupled between a first touched point of the left side-surface touch sensor 140-11 and a second touched point of the right side-surface touch sensor 140-12 may be displayed on the front-surface touch screen 120. In addition, when the upper side-surface touch sensor 140-21 and the lower side-surface touch sensor 140-22 are concurrently touched by the user for more than the activation time, a second division line coupled between a third touched point of the upper side-surface touch sensor 140-21 and a fourth touched point of the lower side-surface touch sensor 140-22 may be displayed on the front-surface touch screen 120. Subsequently, as the first touched point of the left side-surface touch sensor 140-11 and the second touched point of the right side-surface touch sensor 140-12 are moved by the user, the first division line may be moved on the front-surface touch screen 120. Similarly, as the third touched point of the upper side-surface touch sensor 140-21 and the fourth touched point of the lower side-surface touch sensor 140-22 are moved by the user, the second division line may be moved on the front-surface touch screen 120. Here, a display region of the front-surface touch screen 120 may be divided into an upper display region and a lower display region by the first division line, and may be divided into a left display region and a right display region by the second division line. After the first touched point of the left side-surface touch sensor 140-11 and the second touched point of the right side-surface touch sensor 140-12 have been moved, the first division line may not be displayed on the front-surface touch screen 120 when a deactivation time (e.g., a set or predetermined deactivation time) elapses. That is, the first division line may disappear from the front-surface touch screen 120. Similarly, after the third touched point of the upper side-surface touch sensor 140-21 and the fourth touched point of the lower side-surface touch sensor 140-22 have been moved, the second division line may not be displayed on the front-surface touch screen 120 when the deactivation time elapses. That is, the second division line may disappear from the front-surface touch screen 120.

In still another example embodiment, while a display region of the front-surface touch screen 120 is divided into an upper display region and a lower display region, a first division line may be displayed again on the front-surface touch screen 120 when the left side-surface touch sensor 140-11 and the right side-surface touch sensor 140-12 are concurrently touched by the user for more than an activation time (e.g., a set or predetermined activation time). Subsequently, as a first touched point of the left side-surface touch sensor 140-11 and a second touched point of the right side-surface touch sensor 140-12 are moved by the user, the upper display region and the lower display region may be relatively adjusted (e.g., an area of the upper display region and an area of the lower display region may be relatively changed). Similarly, while the display region of the front-surface touch screen 120 is divided into a left display region and a right display region, a second division line may be displayed again on the front-surface touch screen 120 when the upper side-surface touch sensor 140-21 and the lower side-surface touch sensor 140-22 are concurrently touched by the user for more than the activation time. Subsequently, as a third touched point of the upper side-surface touch sensor 140-21 and a fourth touched point of the lower side-surface touch sensor 140-22 are moved by the user, the left display region and the right display region may be relatively adjusted (e.g., an area of the left display region and an area of the right display region may be relatively changed). In addition, while the display region of the front-surface touch screen 120 is divided into the left display region, the right display region, the upper display region, and the lower display region, the first division line or the second division line may be partially displayed again on the front-surface touch screen 120 when the left side-surface touch sensor 140-11, the right side-surface touch sensor 140-12, the upper side-surface touch sensor 140-21, or the lower side-surface touch sensor 140-22 is touched by the user for more than the activation time. Subsequently, as the first touched point of the left side-surface touch sensor 140-11, the second touched point of the right side-surface touch sensor 140-12, the third touched point of the upper side-surface touch sensor 140-21, or the fourth touched point of the lower side-surface touch sensor 140-22 is moved by the user, the left and right display regions or the upper and lower display regions may be relatively adjusted (e.g., an area of the left display region and an area of the right display region may be relatively changed, or an area of the upper display region and an area of the lower display region may be relatively changed).

In still another example embodiment, while a display region of the front-surface touch screen 120 is divided into a left display region, a right display region, an upper display region, and a lower display region, a first division line and a second division line may be displayed again on the front-surface touch screen 120 when the left side-surface touch sensor 140-11 and the right side-surface touch sensor 140-12 are concurrently touched in a staggered manner by the user for more than an activation time (e.g., a set or predetermined activation time), or when the upper side-surface touch sensor 140-21 and the lower side-surface touch sensor 140-22 are concurrently touched in a staggered manner by the user for more than the activation time. For example, when the upper side-surface touch sensor 140-21 and the lower side-surface touch sensor 140-22 are concurrently touched in a staggered manner by the user for more than the activation time, the first division line and the second division line may be displayed again on the front-surface touch screen 120. Subsequently, as a first touched point of the left side-surface touch sensor 140-11, a second touched point of the right side-surface touch sensor 140-12, a third touched point of the upper side-surface touch sensor 140-21, or a fourth touched point of the lower side-surface touch sensor 140-22 is moved by the user, divided display regions (e.g., the left display region, the right display region, the upper display region, and the lower display region) of the front-surface touch screen 120 may be rotated about a crossing point of the first division line and the second division line.

In still another example embodiment, while a display region of the front-surface touch screen 120 is divided into a left display region, a right display region, an upper display region, and a lower display region, a first division line and a second division line may be displayed again on the front-surface touch screen 120 when one of the left side-surface touch sensor 140-11 and the right side-surface touch sensor 140-12, and one of the upper side-surface touch sensor 140-21 and the lower side-surface touch sensor 140-22 are concurrently touched by the user for more than an activation time (e.g., a set or predetermined activation time). For example, when the right side-surface touch sensor 140-12 and the lower side-surface touch sensor 140-22 are concurrently touched by the user for more than the activation time, the first division line and the second division line may be displayed again on the front-surface touch screen 120. Subsequently, the user may determine a target display region among divided display regions (e.g., the left display region, the right display region, the upper display region, and the lower display region) by touching one of the divided display regions. Thus, as a first touched point of the left side-surface touch sensor 140-11, a second touched point of the right side-surface touch sensor 140-12, a third touched point of the upper side-surface touch sensor 140-21, or a fourth touched point of the lower side-surface touch sensor 140-22 is moved by the user, the target display region may be zoomed-in or zoomed-out.

The body may be combined with the front-surface touch screen 120 and the side-surface touch sensors 140. As described above, since the front-surface touch screen 120 includes the display panel and the touch sensing panel, the body 160 may include at least one controller for controlling the display panel and the touch sensing panel (e.g., a display controller and a touch sensing controller). Here, the controller may control the display function and the touch sensor function of the front-surface touch screen 120. In addition, the body 160 may include the processor 162 that processes the user-command input through the side-surface touch sensors 140. In some example embodiments, the body 160 may receive the user-command through the front-surface touch screen 120 as well as the side-surface touch sensors 140. The processor 160 may control an overall operation of the electronic device 100 by performing specific calculations and/or specific tasks. For example, the processor 160 may be a micro-processor, a central processing unit (CPU), etc. In addition, the body 160 may further include sensors, memory devices, storage devices, function devices, etc. The sensors may perform various sensing operations of the electronic device 100. For example, the sensors may include a gyro sensor that measures a rotating angular speed, an acceleration sensor that measures a speed and a momentum, a geomagnetic field sensor that acts as a compass, a barometer sensor that measures an altitude, a grip sensor that determines whether the electronic device 100 is gripped by the user, a gesture-proximity-illumination sensor that performs various operations such as a motion recognition, a proximity detection, an illumination measurement, etc., and/or a temperature-humidity sensor that measures a temperature and a humidity. However, the kinds of the sensors included in the electronic device 100 are not limited thereto.

The memory devices may store data for operations of the electronic device 100. For example, the memory devices may include a volatile semiconductor memory device such as a dynamic random access memory (DRAM) device, a static random access memory (SRAM) device, a mobile DRAM device, etc., and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage devices may include a solid state drive (SSD) device, a hard disk drive (HOD) device, a CD-ROM device, etc. The function devices may perform various functions of the electronic device 100. For example, the function devices may include a camera device that performs a camera function, a communication device that performs a communication function (e.g., one or more of code division multiple access (CDMA) module, long term evolution (LTE) module, radio frequency (RF) module, ultra wideband (UWB) module, wireless local area network (WLAN) module, worldwide interoperability for microwave access (WIMAX) module, etc.), a global positioning system (GPS) device, a microphone (MIC) device, a speaker device, etc. However, the kinds of the function devices included in the electronic device 100 are not limited thereto.

As described above, the electronic device 100 may include the side-surface touch sensors 140 for receiving the user-command. As such, the electronic device 100 may allow the user to accurately and precisely input the user-command to the electronic device 100 because the electronic device 100 receives the user-command based on an operation in which at least one of the side-surface touch sensors 140 is touched by the user for more than the activation time and an operation in which the touched point of respective side-surface touch sensors 140 is dragged (e.g., moved) by the user. In brief, the electronic device 100 employs a new user interface, so that the user may accurately and precisely input the user-command to the electronic device 100. Although it is described above that the electronic device 100 is implemented as the watch-shaped mobile device (e.g., referred to as the smart watch), the kinds of the electronic device 100 are not limited thereto. For example, the electronic device 100 may be implemented as a cellular phone, a smart phone, a smart pad, a personal digital assistant (PDA), a portable multimedia player (PMP), an MP3 player, a tablet PC, a laptop, a digital camera, a camcorder, a game console, etc. In addition, although various example embodiments in which the user-command is input to the electronic device 100 are described above, the user-command may be input to the electronic device 100 in various ways without materially departing from the novel teachings and features of the present inventive concept.

Figure 4:
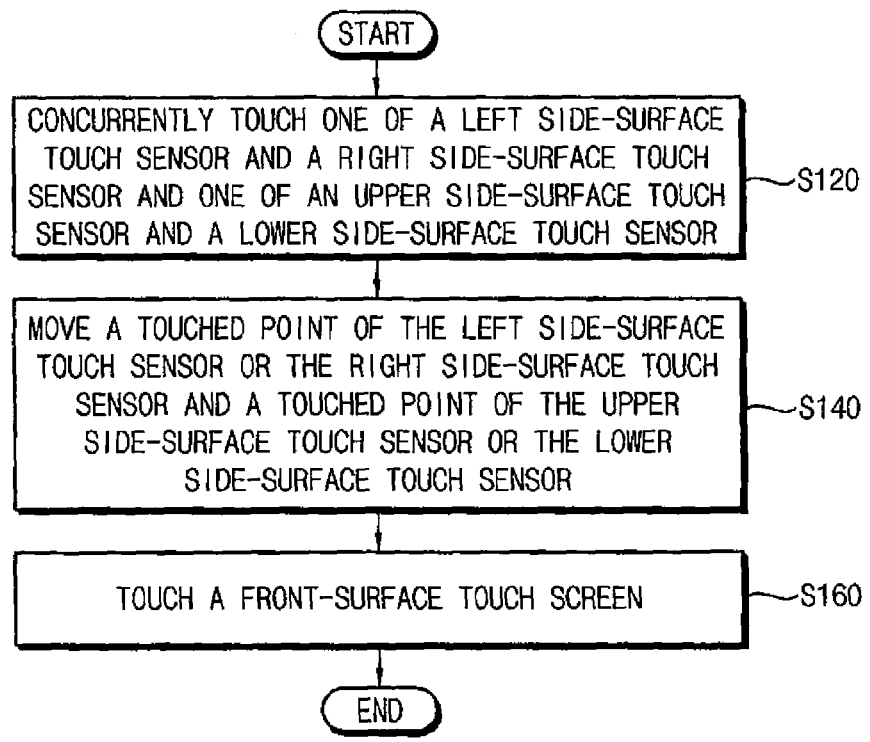
FIG. 4 is a flow chart illustrating a procedure in which a click operation is performed in the electronic device of FIG. 1.

FIG. 4 is a flow chart illustrating a procedure in which a click operation is performed in the electronic device of FIG. 1. FIGS. 5A through 5D are diagrams illustrating an example in which a click operation is performed in the electronic device of FIG. 1. FIG. 6 is a diagram illustrating an example in which a click operation is determined as a right click operation or a left click operation of computer mouse devices in the electronic device of FIG. 1.

Referring to FIGS. 4 through 6, it is illustrated that a click operation CK is performed in the electronic device 100 of FIG. 1. For example, as illustrated in FIGS. 5A and 5B, when one of the left side-surface touch sensor 140-11 and the right side-surface touch sensor 140-12, and one of the upper side-surface touch sensor 140-21 and the lower side-surface touch sensor 140-22 are concurrently touched by a user for more than an activation time (e.g., a set or predetermined activation time) (S120), a first pointer line 122-1 extended from a first touched point of the left side-surface touch sensor 140-11 or the right side-surface touch sensor 140-12, and a second pointer line 122-2 extended from a second touched point of the upper side-surface touch sensor 140-21 or the lower side-surface touch sensor 140-22 may be displayed on the front-surface touch screen 120. Here, a pointer 121 may be displayed at a crossing point of the first pointer line 122-1 and the second pointer line 122-2. That is, when the user concurrently touches one of the left side-surface touch sensor 140-11 and the right side-surface touch sensor 140-12, and one of the upper side-surface touch sensor 140-21 and the lower side-surface touch sensor 140-22 for more than the activation time, the pointer 121, the first pointer line 122-1, and the second pointer line 122-2 may be displayed on the front-surface touch screen 120. For example, it is illustrated in FIGS. 5A and 5B that the first pointer line 122-1 extended from the first touched point of the right side-surface touch sensor 140-12 and the second pointer line 122-2 extended from the second touched point of the lower side-surface touch sensor 140-22 are displayed on the front-surface touch screen 120 when the right side-surface touch sensor 140-12 and the lower side-surface touch sensor 140-22 are concurrently touched by the user for more than the activation time. In addition, it is illustrated that the pointer 121 is displayed at the crossing point of the first pointer line 122-1 and the second pointer line 122-2 when the right side-surface touch sensor 140-12 and the lower side-surface touch sensor 140-22 are concurrently touched by the user for more than the activation time.

Figure 5A:
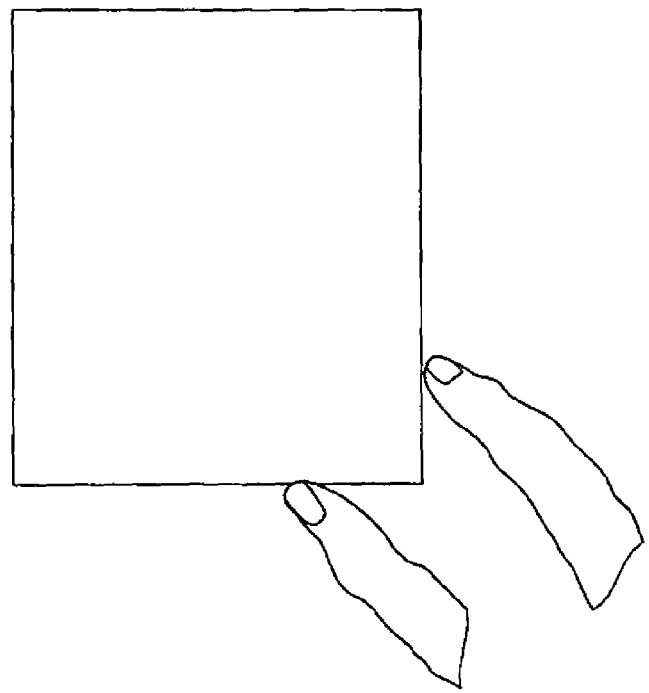
FIGS. 5A through 5D are diagrams illustrating an example in which a click operation is performed in the electronic device of FIG. 1.
Figure 5B:
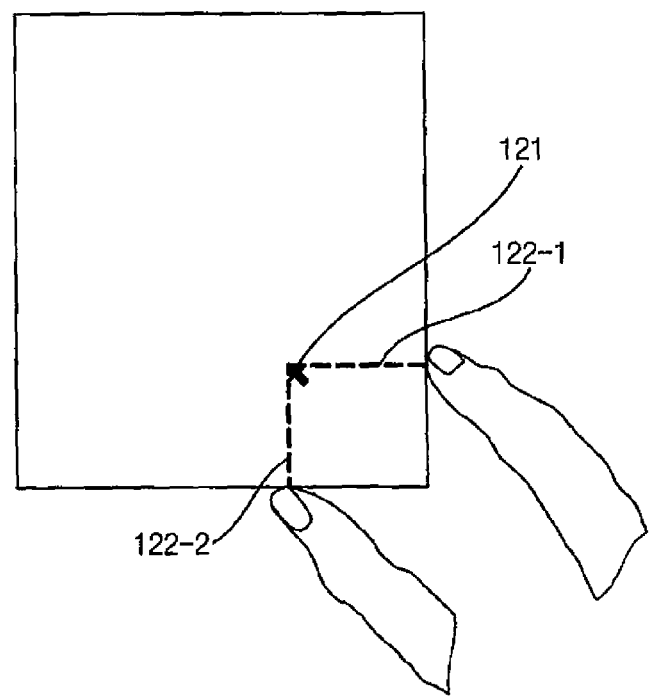
Figure 5C:
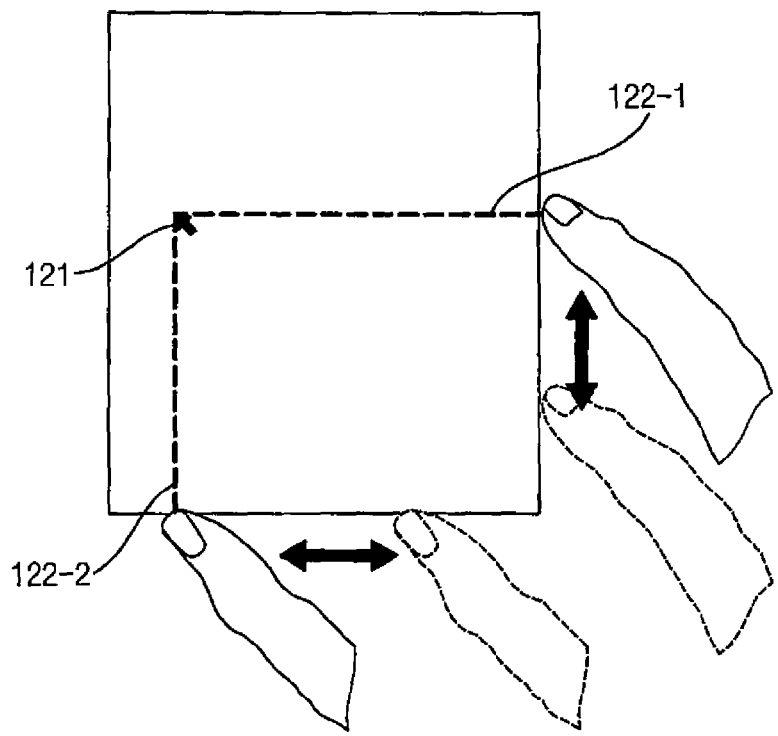
Figure 6:
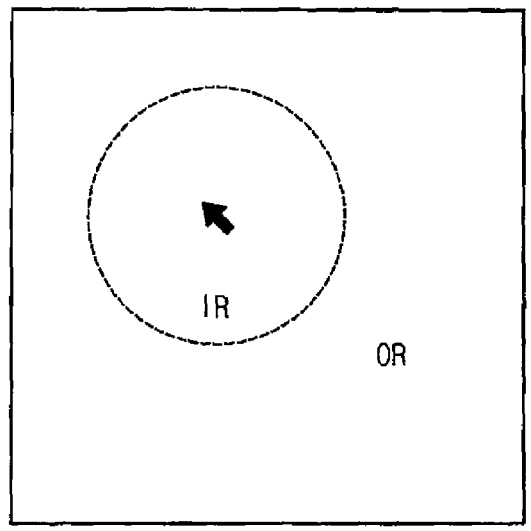
FIG. 6 is a diagram illustrating an example in which a click operation is determined as a right click operation or a left click operation of computer mouse devices in the electronic device of FIG. 1.

Subsequently, as illustrated in FIG. 5C, when the first touched point of the left side-surface touch sensor 140-11 or the right side-surface touch sensor 140-12, and the second touched point of the upper side-surface touch sensor 140-21 or the lower side-surface touch sensor 140-22 are dragged (e.g., moved) by the user (S140), the pointer 121, the first pointer line 122-1, and the second pointer line 122-2 may be moved on the front-surface touch screen 120. Here, the pointer 121, the first pointer line 122-1, and the second pointer line 122-2 may be moved in a drag direction. That is, the user may move the first pointer line 122-1 extended from the first touched point of the left side-surface touch sensor 140-11 or the right side-surface touch sensor 140-12, and the second pointer line 122-2 extended from the second touched point of the upper side-surface touch sensor 140-21 or the lower side-surface touch sensor 140-22 by moving the first touched point of the left side-surface touch sensor 140-11 or the right side-surface touch sensor 140-12, and the second touched point of the upper side-surface touch sensor 140-21 or the lower side-surface touch sensor 140-22. As a result, the pointer 121 that is displayed at the crossing point of the first pointer line 122-1 and the second pointer line 122-2 may be moved on the front-surface touch screen 120. In brief, the user may place the pointer 121 at a desired location on the front-surface touch screen 120 by dragging a touched point of the respective side-surface touch sensors 140 while watching the pointer 121, the first pointer line 122-1, and the second pointer line 122-2 that are displayed on the front-surface touch screen 120. For example, it is illustrated in FIG. 5C that the pointer 121, the first pointer line 122-1, and the second pointer line 122-2 are moved as the first touched point of the right side-surface touch sensor 140-12 and the second touched point of the lower side-surface touch sensor 140-22 are moved.

Figure 5D:
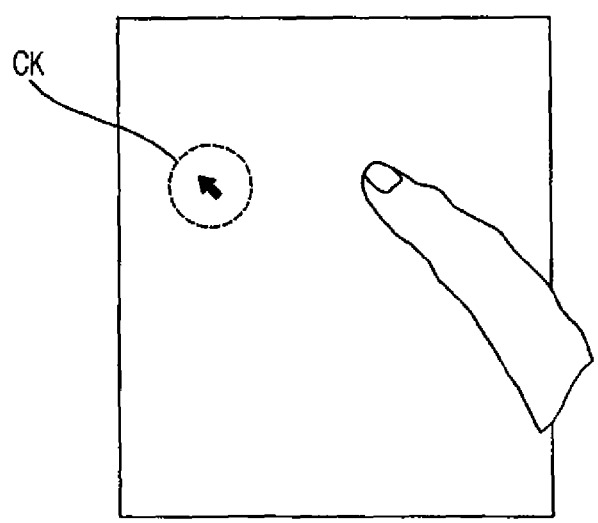

Next, as illustrated in FIG. 5D, while the pointer 121, the first pointer line 122-1, and the second pointer line 122-2 are displayed on the front-surface touch screen 120, the processor 162 of the body 160 may perform a click operation CK on contents (e.g., icon, text, etc.) at which the pointer 121 points when the front-surface touch screen 120 is touched by the user (S160). Here, as illustrated in FIG. 6, the processor 162 of the body 160 may perform a first click operation on the contents when a first region IR of the front-surface touch screen 120 is touched by the user, where the first region IR is a region within a reference distance (e.g., a set or predetermined distance) from the pointer 121. On the other hand, as illustrated in FIG. 6, the processor 162 of the body 160 may perform a second click operation on the contents when a second region OR of the front-surface touch screen 120 is touched by the user, where the second region is a region outside the reference distance from the pointer 121. For example, the first click operation may correspond to a left click operation of a computer mouse device, and the second click operation may correspond to a right click operation of the computer mouse device. However, since these are examples, a way of performing the first click operation and the second click operation, a function of the first click operation and the second click operation, etc. may be determined in various ways. For example, the first click operation may correspond to the right click operation of the computer mouse device, and the second click operation may correspond to the left click operation of the computer mouse device. In some example embodiments, the pointer 121, the first pointer line 122-1, and the second pointer line 122-2 may disappear from the front-surface touch screen 120 when a deactivation time (e.g., a set or predetermined deactivation time) elapses after the first touched point of the left side-surface touch sensor 140-11 or the right side-surface touch sensor 140-12, and the second touched point of the upper side-surface touch sensor 140-21 or the lower side-surface touch sensor 140-22 have been moved by the user. As a result, a pointer movement operation for the click operation CK may be finished.

Figure 7:
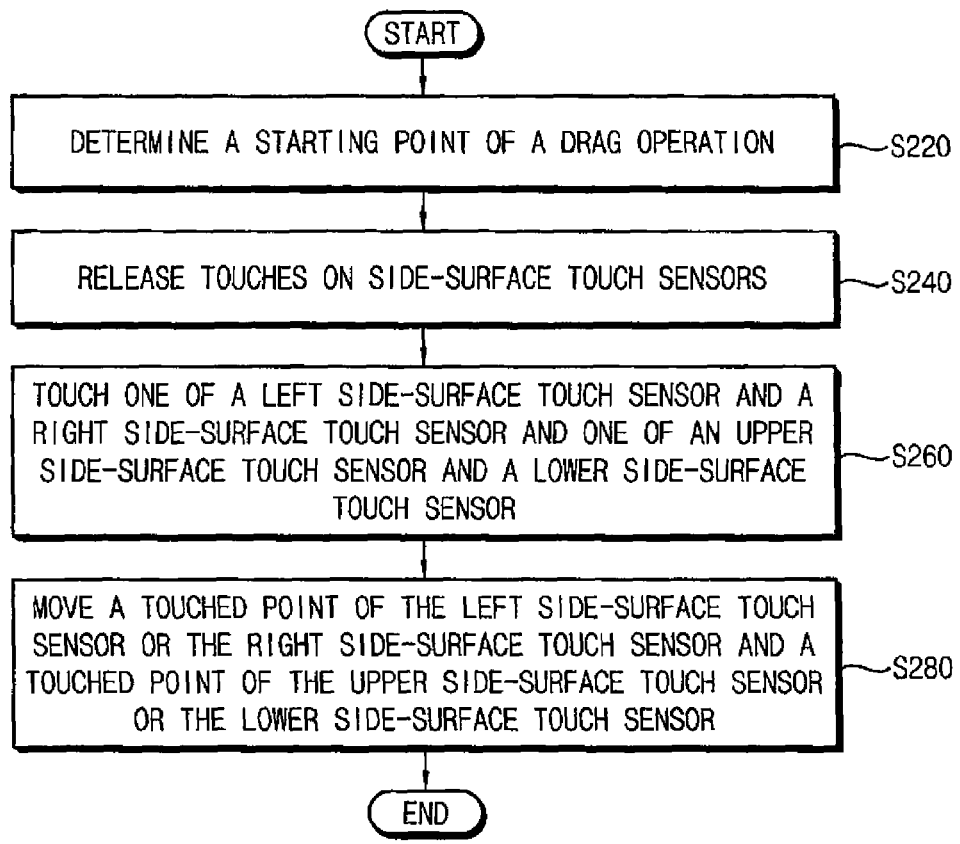
FIG. 7 is a flow chart illustrating a procedure in which a drag operation is performed in the electronic device of FIG. 1.

FIG. 7 is a flow chart illustrating a procedure in which a drag operation is performed in the electronic device of FIG. 1. FIGS. 8A through 8D are diagrams illustrating an example in which a drag operation is performed in the electronic device of FIG. 1.

Figure 8A:
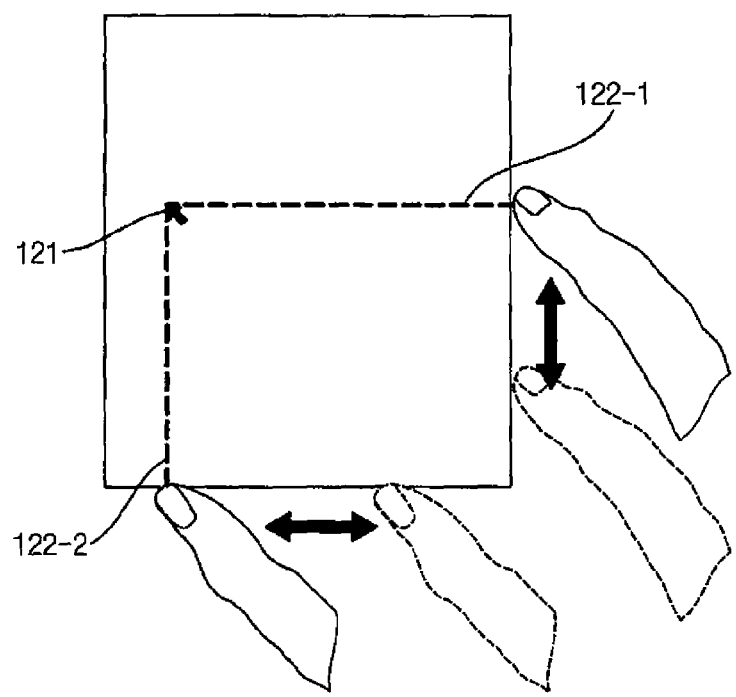
FIGS. 8A through 8D are diagrams illustrating an example in which a drag operation is performed in the electronic device of FIG. 1.
Figure 8B:
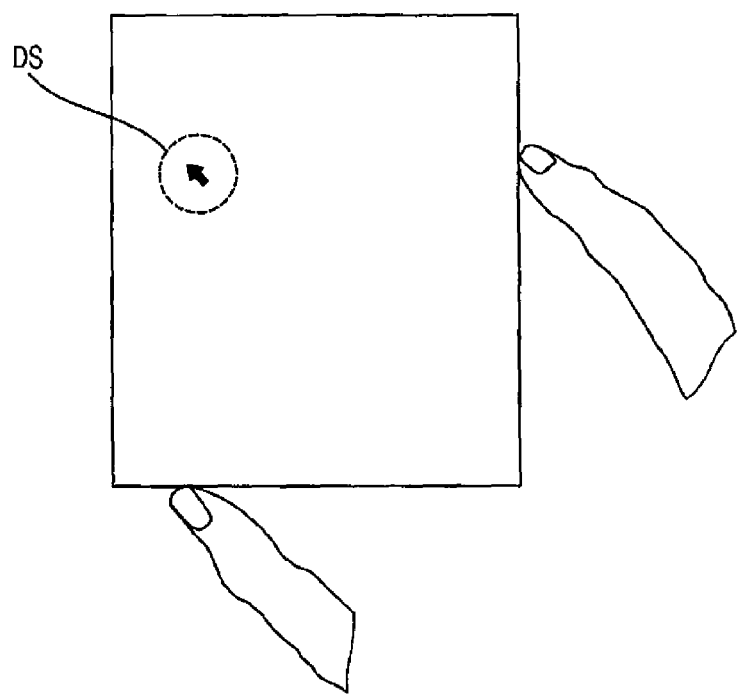
Figure 8C:
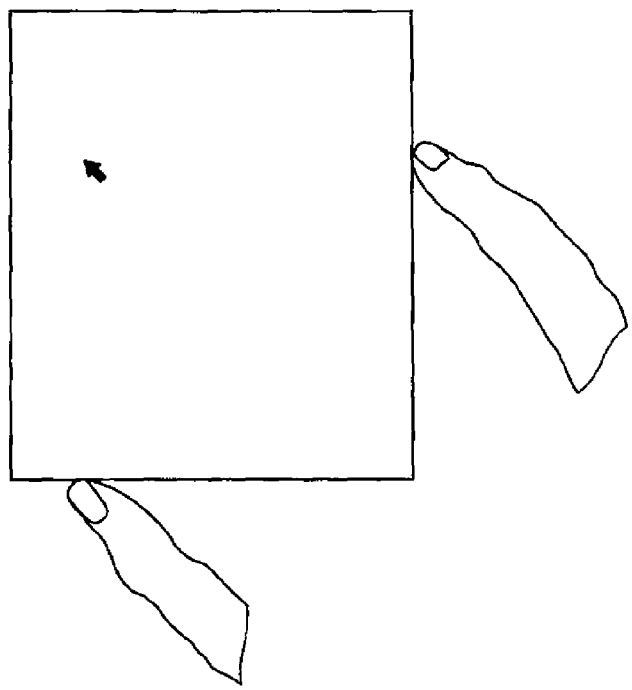
Figure 8D:
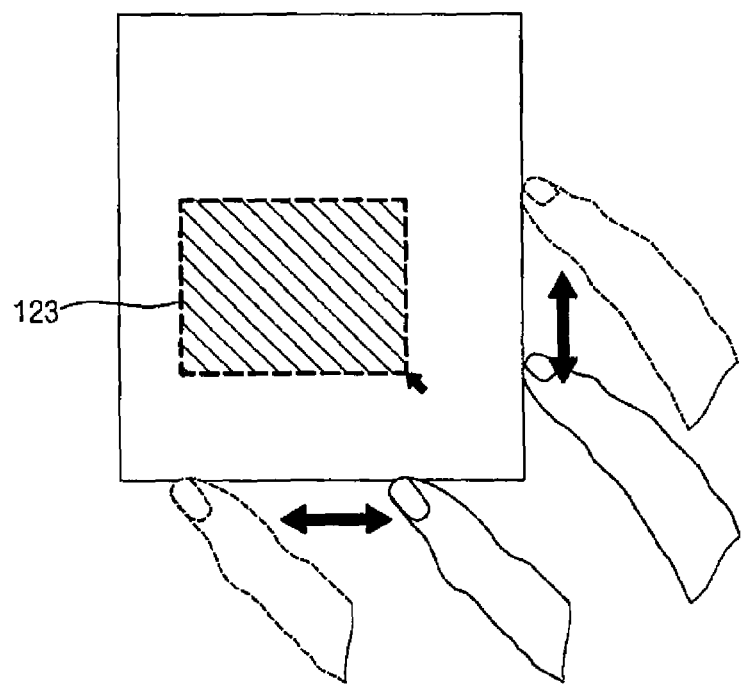

Referring to FIGS. 7 through 8D, it is illustrated that a drag operation is performed in the electronic device 100 of FIG. 1. For example, as illustrated in FIGS. 8A and 8B, a starting point DS of the drag operation may be determined (S220) as the pointer 121, the first pointer line 122-1, and the second pointer line 122-2 that are displayed on the front-surface touch screen 120 are moved by the user. Subsequently, as illustrated in FIGS. 8B and 8C, touches on the side-surface touch sensors 140 may be released by the user (S240), and then one of the left side-surface touch sensor 140-11 and the right side-surface touch sensor 140-12, and one of the upper side-surface touch sensor 140-21 and the lower side-surface touch sensor 140-22 may be touched again by the user within a reactivation time (e.g., a set or predetermined reactivation time) (S260). Next, as illustrated in FIG. 8D, when a first touched point of the left side-surface touch sensor 140-11 or the right side-surface touch sensor 140-12, and a second touched point of the upper side-surface touch sensor 140-21 or the lower side-surface touch sensor 140-22 are moved by the user (S280), a drag region 123 may be set (or determined) based on a moving distance of the first touched point of the left side-surface touch sensor 140-11 or the right side-surface touch sensor 140-12, and a moving distance of the second touched point of the upper side-surface touch sensor 140-21 or the lower side-surface touch sensor 140-22. That is, the drag operation may be performed by moving the first touched point of the left side-surface touch sensor 140-11 or the right side-surface touch sensor 140-12, and the second touched point of the upper side-surface touch sensor 140-21 or the lower side-surface touch sensor 140-22. For example, it is illustrated in FIG. 8D that the drag operation is performed by moving the first touched point of the right side-surface touch sensor 140-12 and the second touched point of the lower side-surface touch sensor 140-22.

Figure 9:
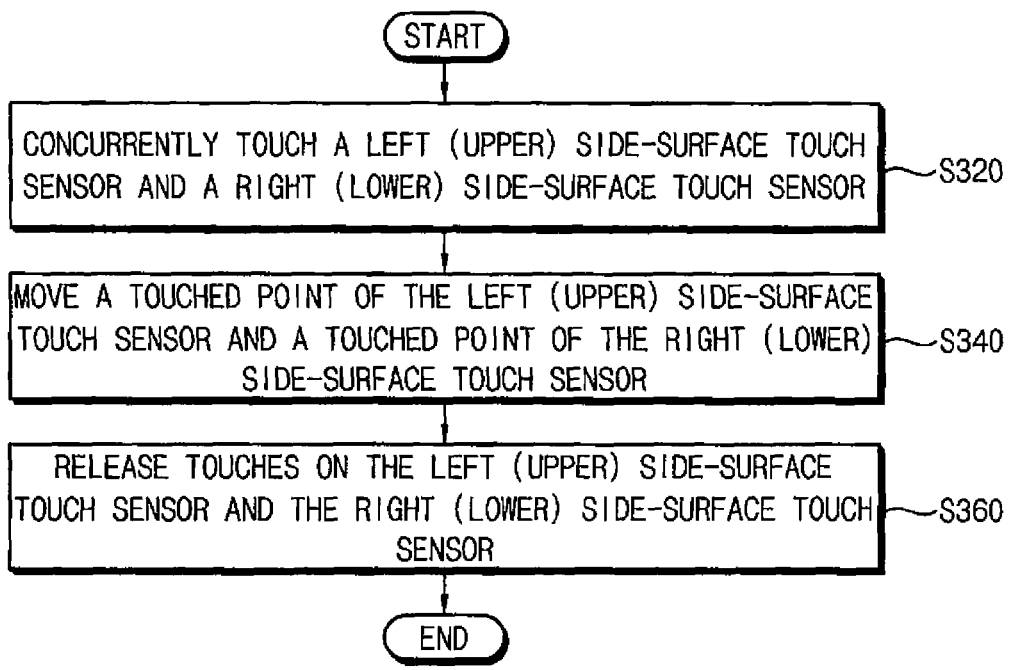
FIG. 9 is a flow chart illustrating a procedure in which a region division operation is performed in the electronic device of FIG. 1.
Figure 10A:
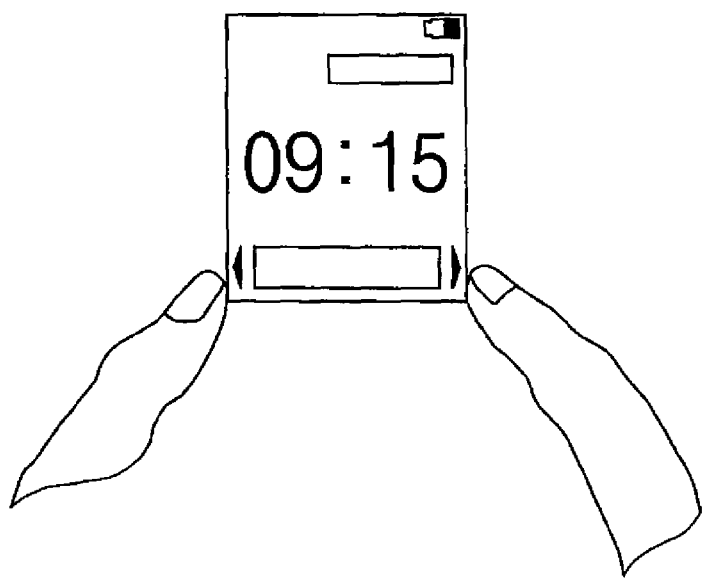
FIGS. 10A through 10D are diagrams illustrating an example in which a region division operation is performed in the electronic device of FIG. 1.
Figure 10B:
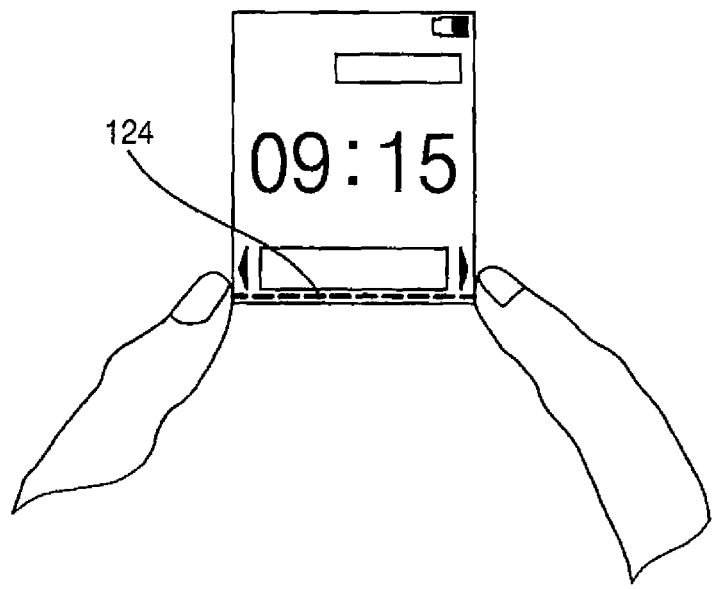
Figure 10C:
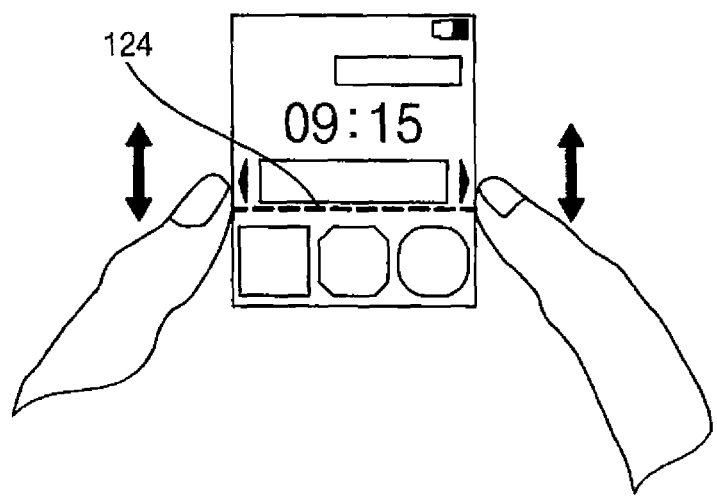
Figure 10D:
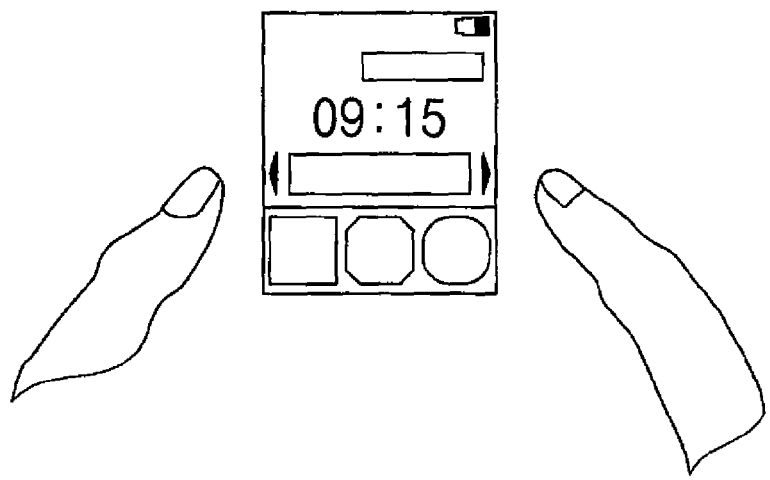

FIG. 9 is a flow chart illustrating a procedure in which a region division operation is performed in the electronic device of FIG. 1. FIGS. 10A through 10D are diagrams illustrating an example in which a region division operation is performed in the electronic device of FIG. 1. FIGS. 11A through 11D are diagrams illustrating another example in which a region division operation is performed in the electronic device of FIG. 1.

Referring to FIGS. 9 through 11D, it is illustrated that the region division operation is performed in the electronic device of FIG. 1. As illustrated in FIGS. 10A and 10B, when the left side-surface touch sensor 140-11 and the right side-surface touch sensor 140-12 are concurrently touched by the user for more than an activation time (e.g., a set or predetermined activation time) (S320), a first division line 124 coupled between a first touched point of the left side-surface touch sensor 140-11 and a second touched point of the right side-surface touch sensor 140-12 may be displayed on the front-surface touch screen 120. Subsequently, as illustrated in FIG. 10C, as the first touched point of the left side-surface touch sensor 140-11 and the second touched point of the right side-surface touch sensor 140-12 are moved by the user (S340), the first division line 124 may be moved on the front-surface touch screen 120. Next, as illustrated in FIG. 10D, when touches on the left side-surface touch sensor 140-11 and the right side-surface touch sensor 140-12 are released by the user (S360), a display region of the front-surface touch screen 120 may be divided into an upper display region and a lower display region by the first division line 124. In some example embodiments, the first division line 124 may disappear on the front-surface touch screen 120 when a deactivation time (e.g., a set or predetermined deactivation time) elapses after the first touched point of the left side-surface touch sensor 140-11 and the second touched point of the right side-surface touch sensor 140-12 have been moved.

Figure 11A:
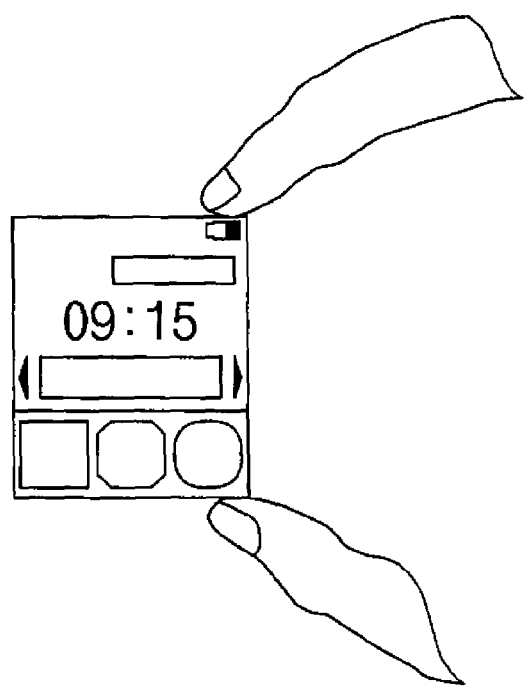
FIGS. 11A through 11D are diagrams illustrating another example in which a region division operation is performed in the electronic device of FIG. 1.
Figure 11B:
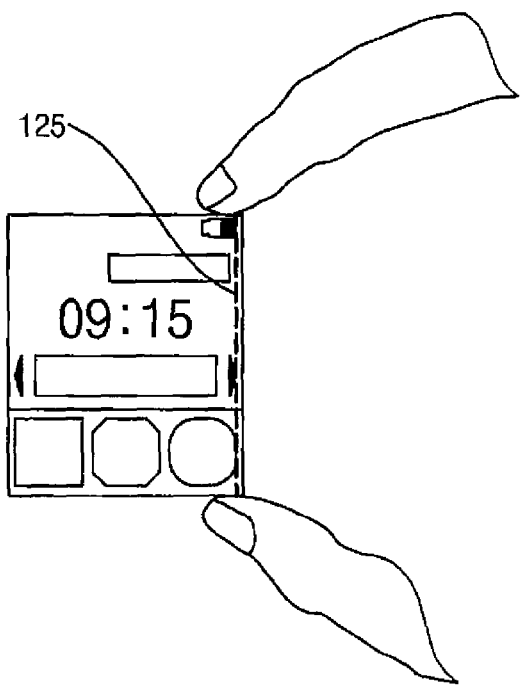
Figure 11C:
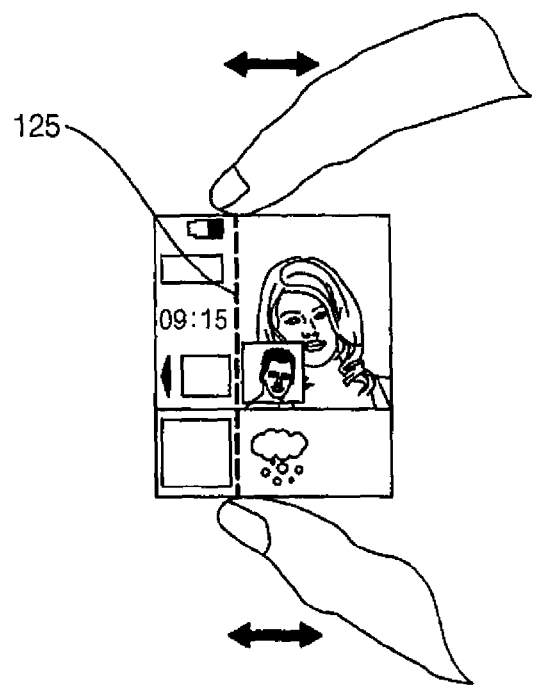
Figure 11D:
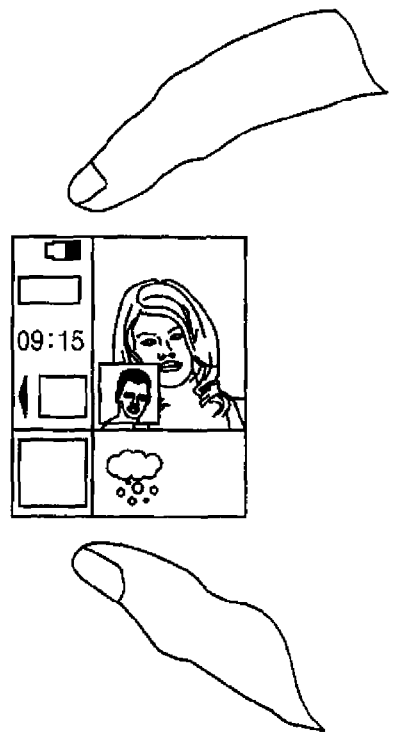

Similarly, as illustrated in FIGS. 11A and 11B, when the upper side-surface touch sensor 140-21 and the lower side-surface touch sensor 140-22 are concurrently touched by the user for more than the activation time (S320), a second division line 125 coupled between a third touched point of the upper side-surface touch sensor 140-21 and a fourth touched point of the lower side-surface touch sensor 140-22 may be displayed on the front-surface touch screen 120. Subsequently, as illustrated in FIG. 11C, as the third touched point of the upper side-surface touch sensor 140-21 and the fourth touched point of the lower side-surface touch sensor 140-22 are moved by the user (S340), the second division line 125 may be moved on the front-surface touch screen 120. Next, as illustrated in FIG. 11D, when touches on the upper side-surface touch sensor 140-21 and the lower side-surface touch sensor 140-22 are released by the user (S360), a display region of the front-surface touch screen 120 may be divided into a left display region and a right display region by the second division line 125. In some example embodiments, the second division line 125 may disappear on the front-surface touch screen 120 when the deactivation time elapses after the third touched point of the upper side-surface touch sensor 140-21 and the fourth touched point of the lower side-surface touch sensor 140-22 have been moved.

Figure 12:
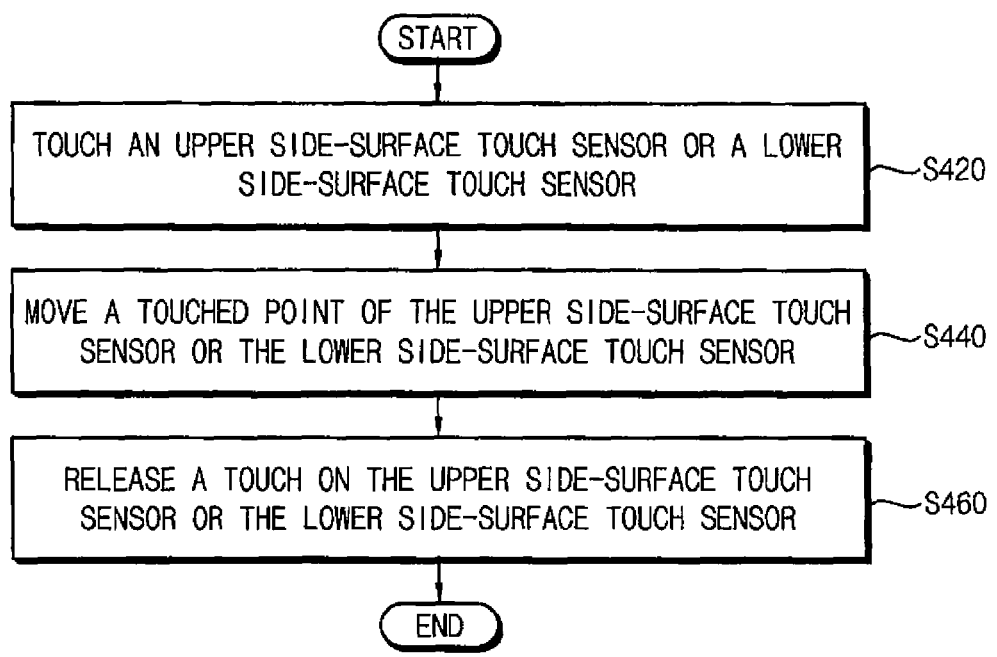
FIG. 12 is a flow chart illustrating a procedure in which a region division operation is partially performed in the electronic device of FIG. 1.

FIG. 12 is a flow chart illustrating a procedure in which a region division operation is partially performed in the electronic device of FIG. 1. FIGS. 13A through 13D are diagrams illustrating an example in which a region division operation is partially performed in the electronic device of FIG. 1.

Figure 13A:
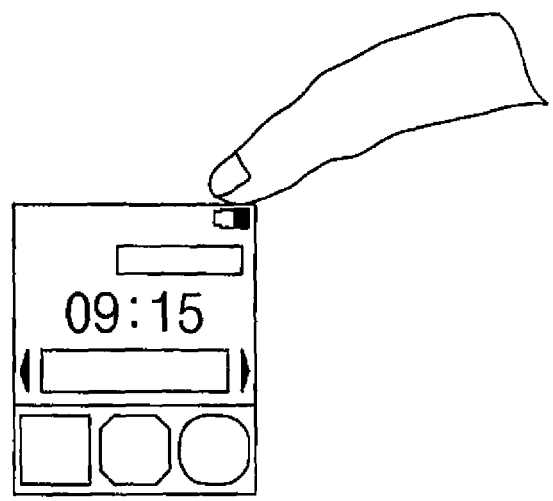
FIGS. 13A through 13D are diagrams illustrating an example in which a region division operation is partially performed in the electronic device of FIG. 1.
Figure 13B:
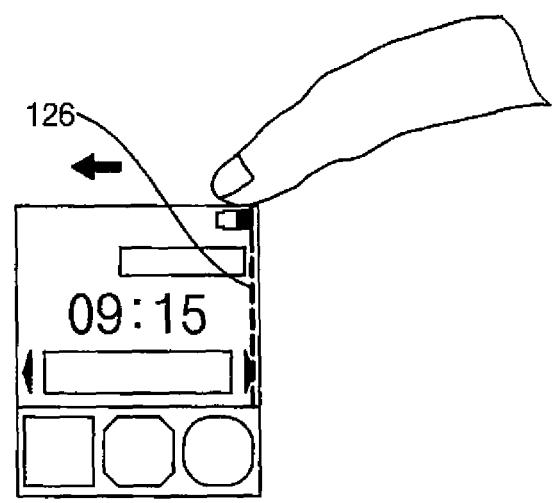
Figure 13C:
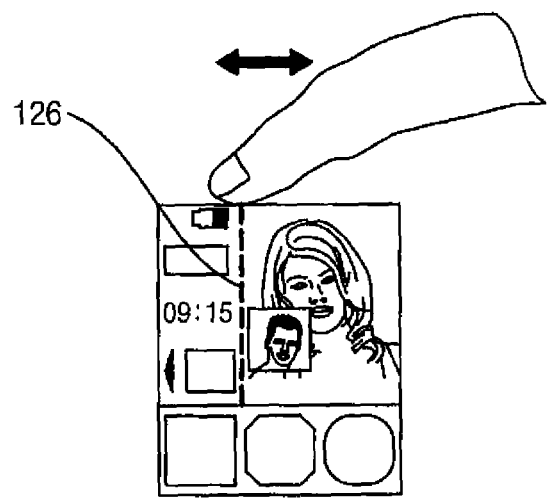
Figure 13D:
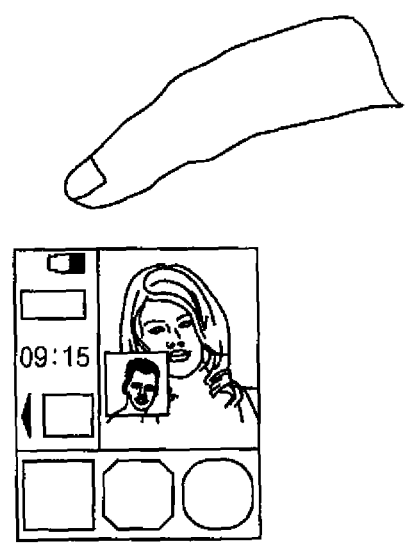

Referring to FIGS. 12 through 13D, it is illustrated that the region division operation is partially performed in the electronic device of FIG. 1. For example, as illustrated in FIGS. 13A and 13B, while a display region of the front-surface touch screen 120 is divided into an upper display region and a lower display region, a partial division line 126 may be displayed on the upper display region or the lower display region of the front-surface touch screen 120 when the upper side-surface touch sensor 140-21 or the lower side-surface touch sensor 140-22 is touched by the user for more than an activation time (e.g., a set or predetermined activation time) (S420). For example, it is illustrated in FIGS. 13A and 13B that the partial division line 126 is displayed on the upper display region of the front-surface touch screen 120 when the upper side-surface touch sensor 140-21 is touched by the user for more than the activation time. Subsequently, as illustrated in FIG. 13C, as a touched point of the upper side-surface touch sensor 140-21 or the lower side-surface touch sensor 140-22 is moved by the user (S440), the partial division line 126 may be moved, and thus the upper display region or the lower display region may be divided into a left display region and a right display region. For example, it is illustrated in FIG. 13C that the upper display region is divided into the left display region and the right display region by the partial division line 126. Next, as illustrated in FIG. 13D, when a touch on the upper side-surface touch sensor 140-21 or the lower side-surface touch sensor 140-22 is released by the user (S460), the region division operation for the upper display region or the lower display region may be finished. However, the present inventive concept is not limited thereto. For example, a left display region (or a right display region) may be divided into an upper display region and a lower display region. In addition, upper and lower display regions (or left and right display regions) may be simultaneously divided into left and right display regions (or upper and lower display regions).

Figure 14:
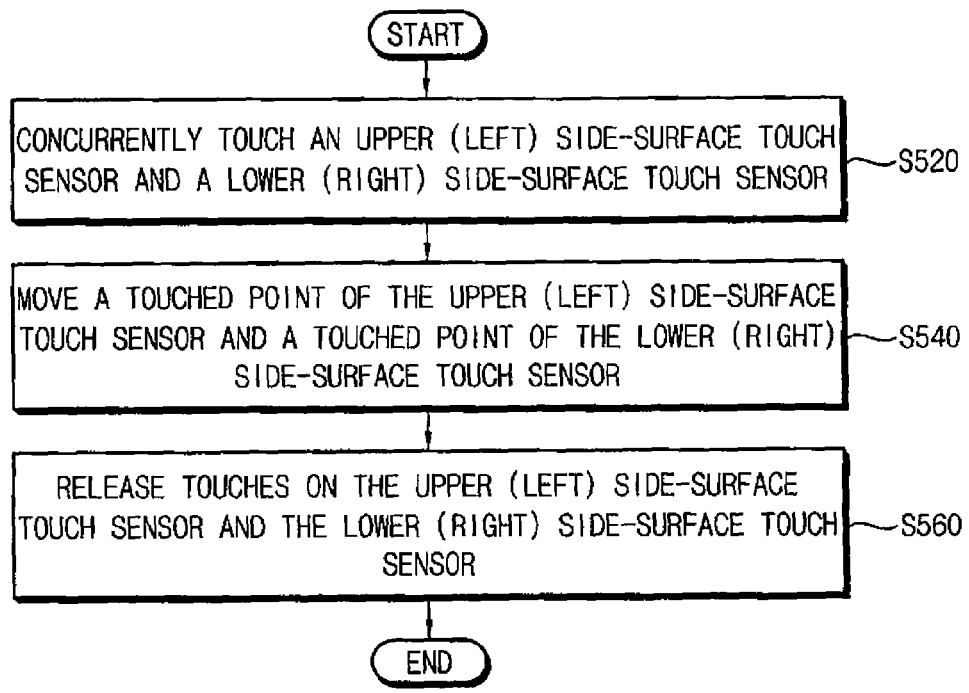
FIG. 14 is a flow chart illustrating a procedure in which a region adjustment operation is performed in the electronic device of FIG. 1.

FIG. 14 is a flow chart illustrating a procedure in which a region adjustment operation is performed in the electronic device of FIG. 1. FIGS. 15A through 15D are diagrams illustrating an example in which a region adjustment operation is performed in the electronic device of FIG. 1.

Figure 15A:
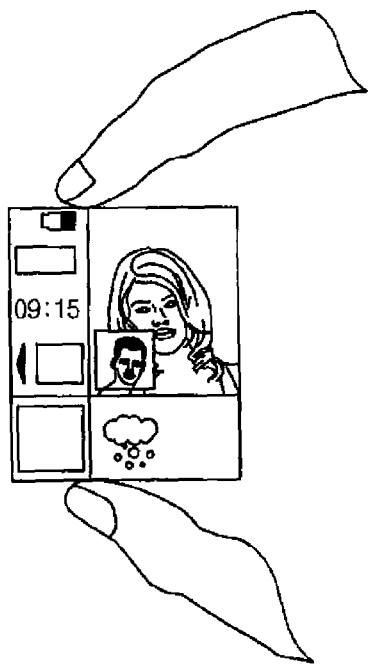
FIGS. 15A through 15D are diagrams illustrating an example in which a region adjustment operation is performed in the electronic device of FIG. 1.
Figure 15B:
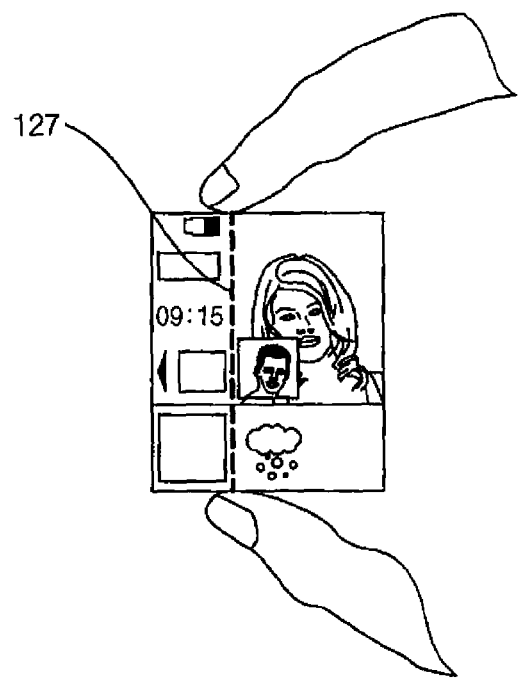
Figure 15C:
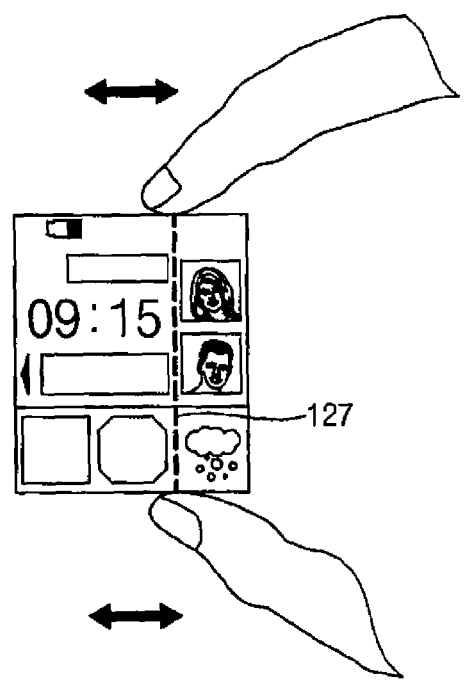
Figure 15D:
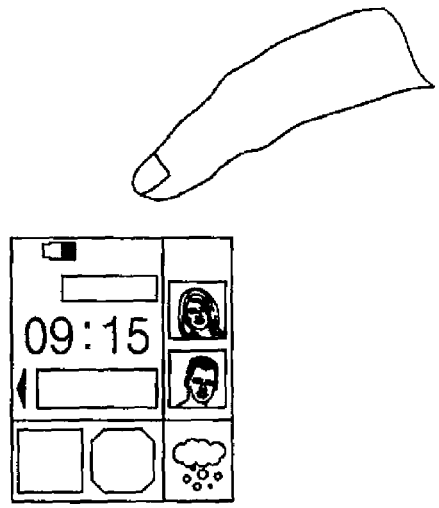

Referring to FIGS. 14 through 15D, it is illustrated that the region adjustment operation is performed in the electronic device of FIG. 1. For example, as illustrated in FIGS. 15A and 15B, while a display region of the front-surface touch screen 120 is divided into an upper display region, a lower display region, a left display region, and a right display region, a vertical division line 127 (e.g., a left region-right region division line) may be displayed again on the front-surface touch screen 120 when the upper side-surface touch sensor 140-21 and the lower side-surface touch sensor 140-22 are concurrently touched by the user for more than an activation time (e.g., a set or predetermined activation time) (S520). Subsequently, as illustrated in FIG. 15C, the left display region and the right display region may be relatively adjusted (e.g., an area of the left display region and an area of the right display region may be relatively changed) as a touched point of the upper side-surface touch sensor 140-21 and a touched point of the lower side-surface touch sensor 140-22 are moved by the user (S540). Next, as illustrated in FIG. 15D, when touches on the upper side-surface touch sensor 140-21 and the lower side-surface touch sensor 140-22 are released by the user (S560), the region adjustment operation for the left display region and the right display region may be finished. Similarly, while the display region of the front-surface touch screen 120 is divided into the upper display region, the lower display region, the left display region, and the right display region, a horizontal division line 127 (e.g., an upper region-lower region division line) may be displayed again on the front-surface touch screen 120 when the left side-surface touch sensor 140-11 and the right side-surface touch sensor 140-12 are concurrently touched by the user for more than the activation time. Subsequently, the upper display region and the lower display region may be relatively adjusted (e.g., an area of the upper display region and an area of the lower display region may be relatively changed) as a touched point of the left side-surface touch sensor 140-11 and a touched point of the right side-surface touch sensor 140-12 are moved by the user. Next, when touches on the left side-surface touch sensor 140-11 and the right side-surface touch sensor 140-12 are released by the user, the region adjustment operation for the upper display region and the lower display region may be finished.

Figure 16:
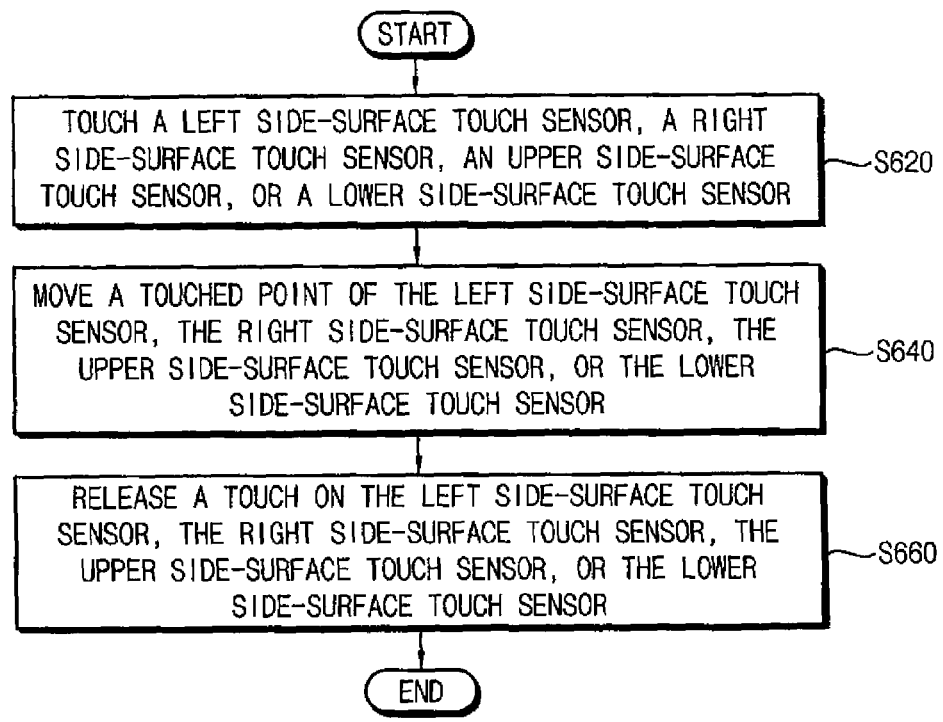
FIG. 16 is a flow chart illustrating a procedure in which a region adjustment operation is partially performed in the electronic device of FIG. 1.

FIG. 16 is a flow chart illustrating a procedure in which a region adjustment operation is partially performed in the electronic device of FIG. 1. FIGS. 17A through 17D are diagrams illustrating an example in which a region adjustment operation is partially performed in the electronic device of FIG. 1.

Figure 17A:
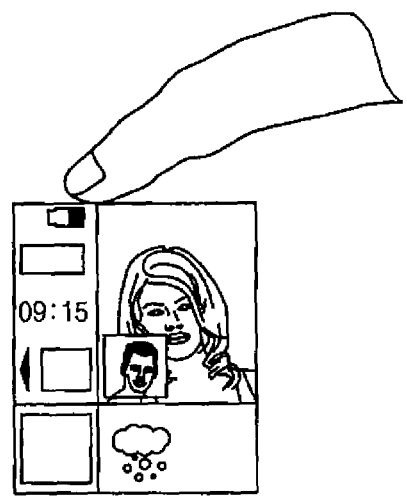
FIGS. 17A through 17D are diagrams illustrating an example in which a region adjustment operation is partially performed in the electronic device of FIG. 1.
Figure 17B:
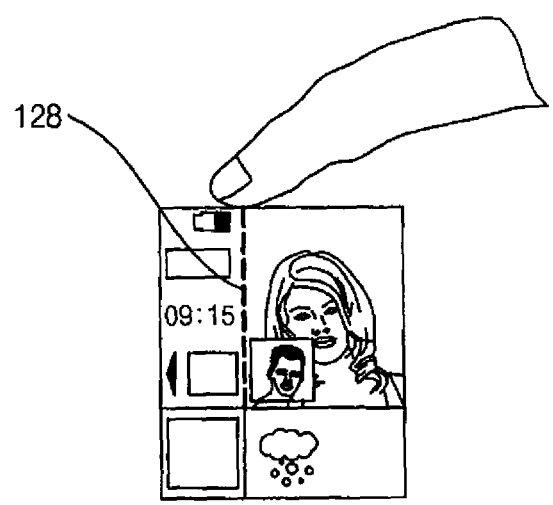
Figure 17C:
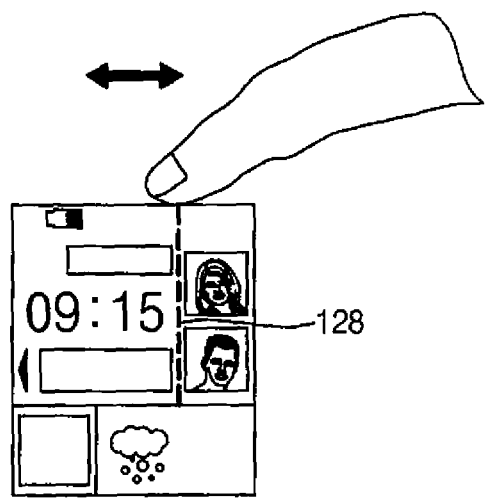
Figure 17D:
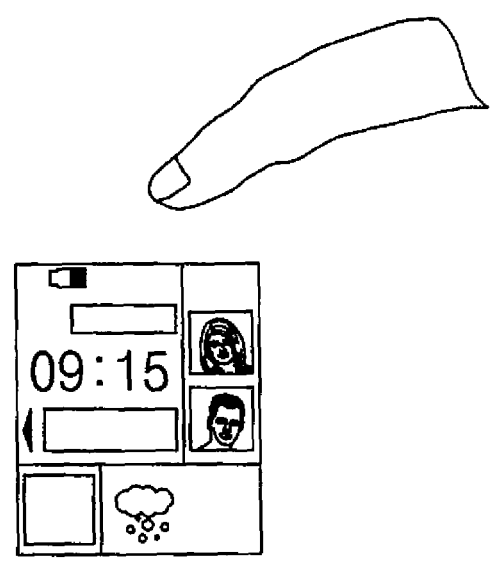

Referring to FIGS. 16 through 17D, it is illustrated that the region adjustment operation is partially performed in the electronic device of FIG. 1. For example, as illustrated in FIGS. 17A and 17B, while a display region of the front-surface touch screen 120 is divided into an upper display region, a lower display region, a left display region, and a right display region, a partial division line 128 may be displayed on the front-surface touch screen 120 when the left side-surface touch sensor 140-11, the right side-surface touch sensor 140-12, the upper side-surface touch sensor 140-21, or the lower side-surface touch sensor 140-22 is touched by the user for more than an activation time (e.g., a set or predetermined activation time) (S620). For example, it is illustrated in FIGS. 17A and 17B that the partial division line 128 is displayed on the upper display region of the front-surface touch screen 120 when the upper side-surface touch sensor 140-21 is touched by the user for more than the activation time. Subsequently, as illustrated in FIG. 17C, the region adjustment operation may be performed on each display region of the front-surface touch screen 120 (e.g., the upper display region, the lower display region, the left display region, or the right display region) as a touched point of the left side-surface touch sensor 140-11, the right side-surface touch sensor 140-12, the upper side-surface touch sensor 140-21, or the lower side-surface touch sensor 140-22 is moved by the user (S640). For example, it is illustrated in FIG. 17C that left and right display regions of the upper display region are relatively adjusted (e.g., an area of the left display region of the upper display region and an area of the right display region of the upper display region are relatively changed). Next, as illustrated in FIG. 17D, when a touch on the left side-surface touch sensor 140-11, the right side-surface touch sensor 140-12, the upper side-surface touch sensor 140-21, or the lower side-surface touch sensor 140-22 are released by the user (S660), the region adjustment operation for each display region (e.g., the upper display region, the lower display region, the left display region, or the right display region) may be finished.

Figure 18:
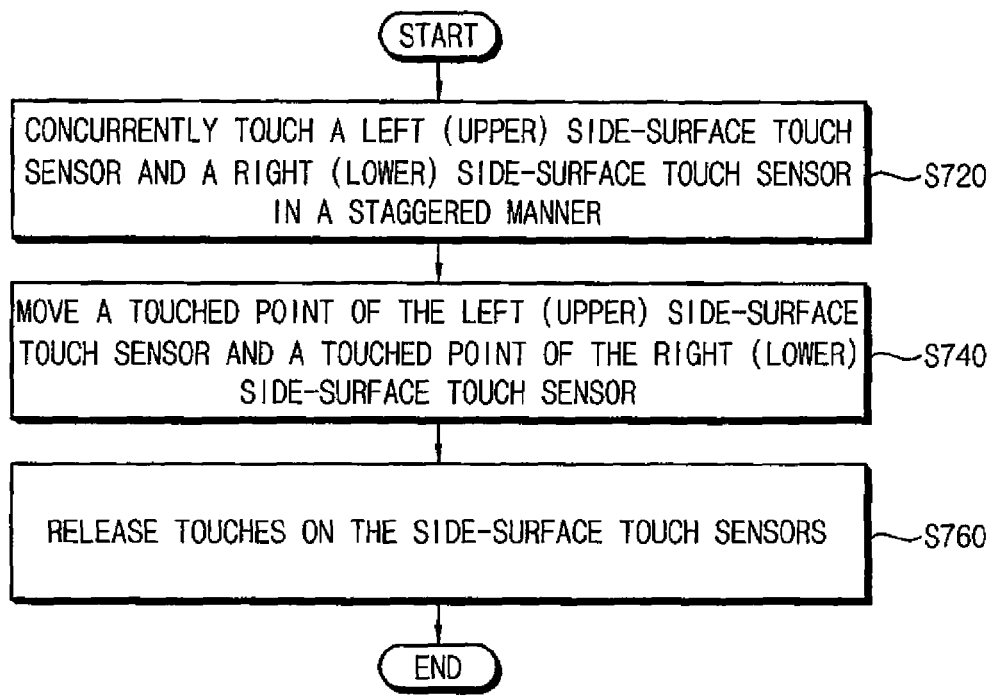
FIG. 18 is a flow chart illustrating a procedure in which a region movement operation is performed in the electronic device of FIG. 1.

FIG. 18 is a flow chart illustrating a procedure in which a region movement operation is performed in the electronic device of FIG. 1. FIGS. 19A through 19D are diagrams illustrating an example in which a region movement operation is performed in the electronic device of FIG. 1.

Figure 19A:
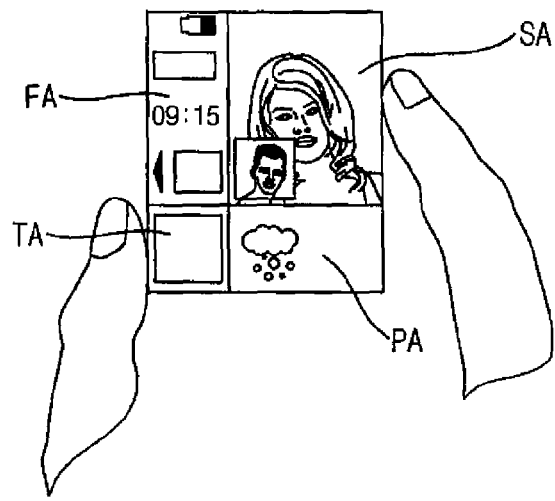
FIGS. 19A through 19D are diagrams illustrating an example in which a region movement operation is performed in the electronic device of FIG. 1.
Figure 19B:
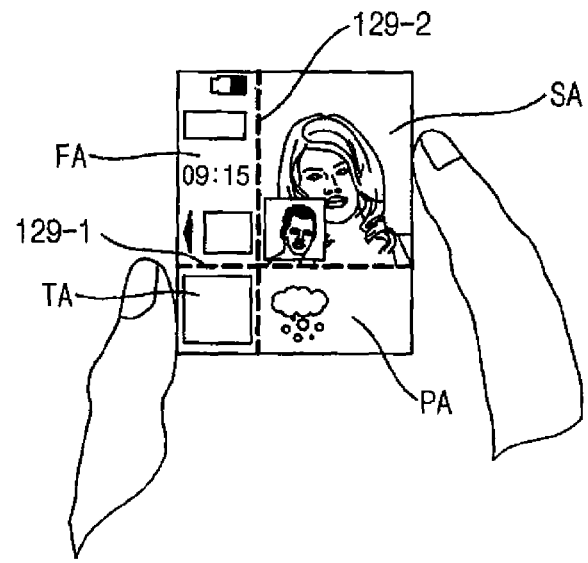
Figure 19C:
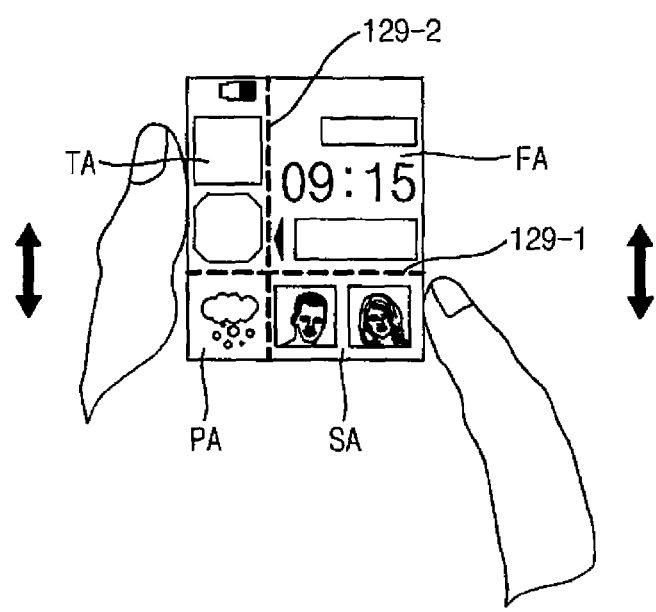
Figure 19D:
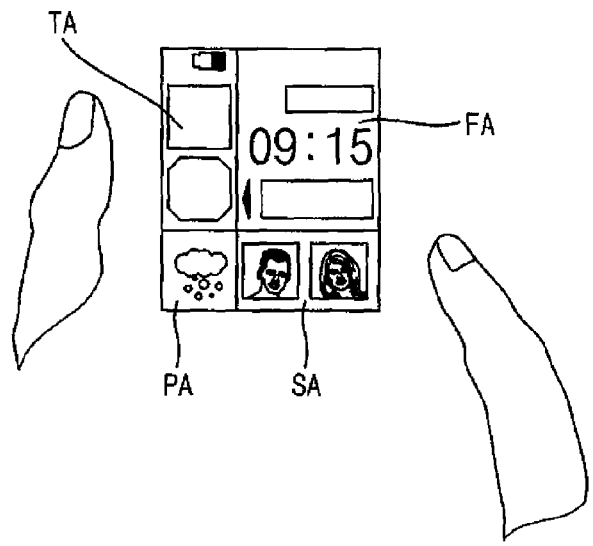

Referring to FIGS. 18 through 19D, it is illustrated that the region movement operation is performed in the electronic device of FIG. 1. For example, as illustrated in FIGS. 19A and 19B, while a display region of the front-surface touch screen 120 is divided into a left display region, a right display region, an upper display region, and a lower display region, a first division line 129-1 and a second division line 129-2 may be displayed again on the front-surface touch screen 120 when the left side-surface touch sensor 140-11 and the right side-surface touch sensor 140-12 are concurrently touched in a staggered manner by the user for more than an activation time (e.g., a set or predetermined activation time) (S720), or when the upper side-surface touch sensor 140-21 and the lower side-surface touch sensor 140-22 are concurrently touched in a staggered manner by the user for more than the activation time (S720). As illustrated in FIGS. 19A and 19B, the display region of the front-surface touch screen 120 may include first through fourth display regions FA, SA, TA, and PA that are divided by the first division line 129-1 and the second division line 129-2. For example, it is illustrated in FIGS. 19A and 19B that the left side-surface touch sensor 140-11 and the right side-surface touch sensor 140-12 are concurrently touched in a staggered manner by the user for more than the activation time. Subsequently, as illustrated in FIG. 19C, the first through fourth display regions FA, SA, TA, and PA of the front-surface touch screen 120 may be rotated about a crossing point of the first division line 129-1 and the second division line 129-2 as a touched point of the left side-surface touch sensor 140-11 and a touched point of the right side-surface touch sensor 140-12 are moved by the user (S740), or as a touched point of the upper side-surface touch sensor 140-21 and a touched point of the lower side-surface touch sensor 140-22 are moved by the user (S740). For example, it is illustrated in FIG. 19C that the touched point of the left side-surface touch sensor 140-11 and the touched point of the right side-surface touch sensor 140-12 are moved by the user. Next, as illustrated in FIG. 19D, when touches on side-surface touch sensors 140 are released by the user (S760), the region movement operation for the first through fourth display regions FA, SA, TA, and PA may be finished.

Figure 20:
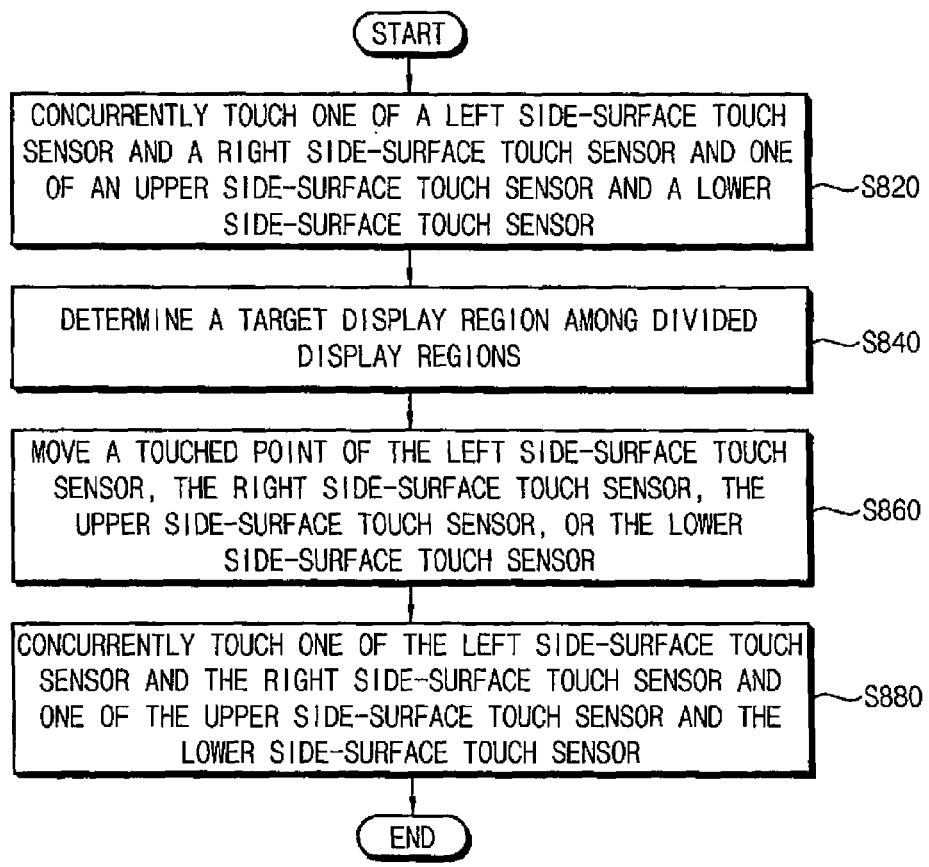
FIG. 20 is a flow chart illustrating a procedure in which a region zooming operation is performed in the electronic device of FIG. 1.

FIG. 20 is a flow chart illustrating a procedure in which a region zooming operation is performed in the electronic device of FIG. 1. FIGS. 21A through 21E are diagrams illustrating an example in which a region zooming operation is performed in the electronic device of FIG. 1.

Figure 21A:
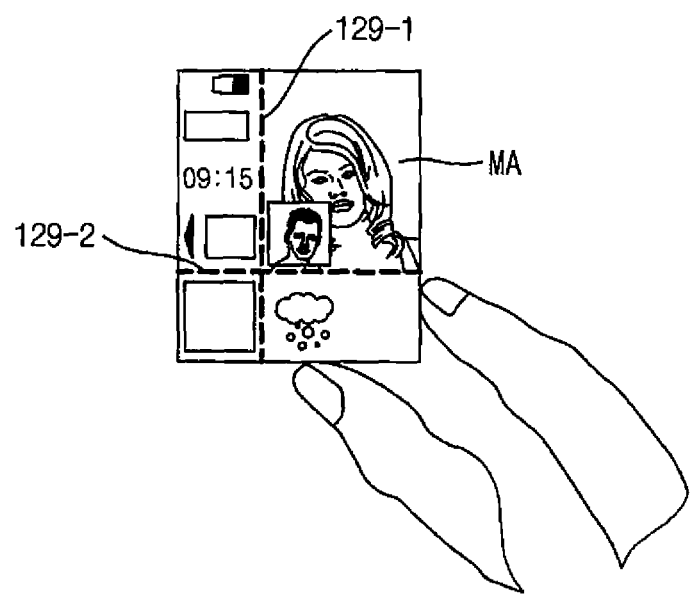
FIGS. 21A through 21E are diagrams illustrating an example in which a region zooming operation is performed in the electronic device of FIG. 1.
Figure 21B:
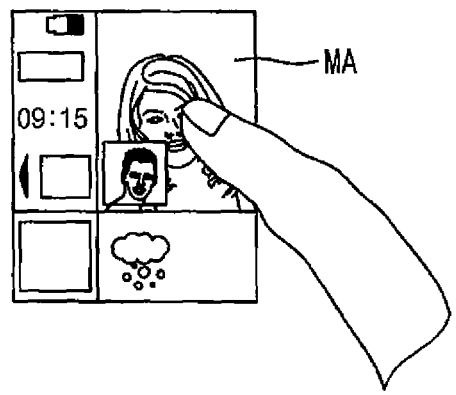
Figure 21C:
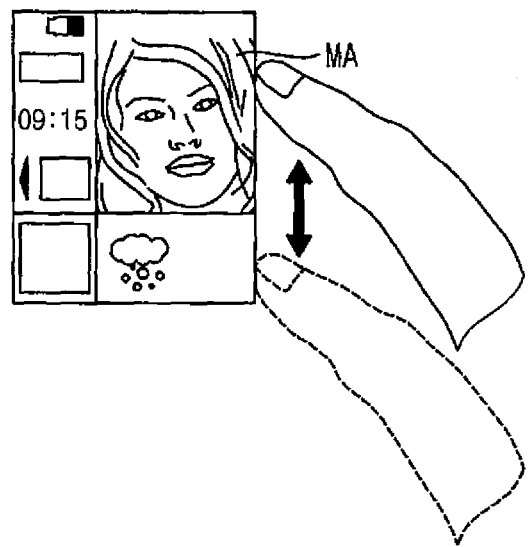
Figure 21D:
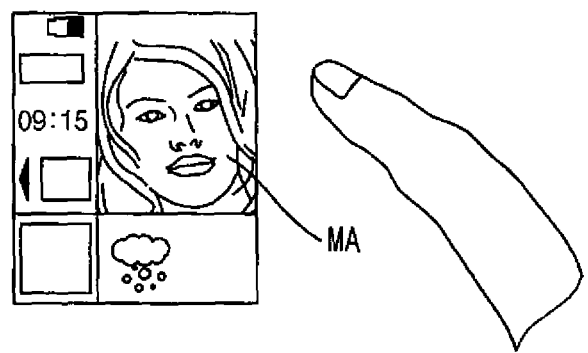
Figure 21E:
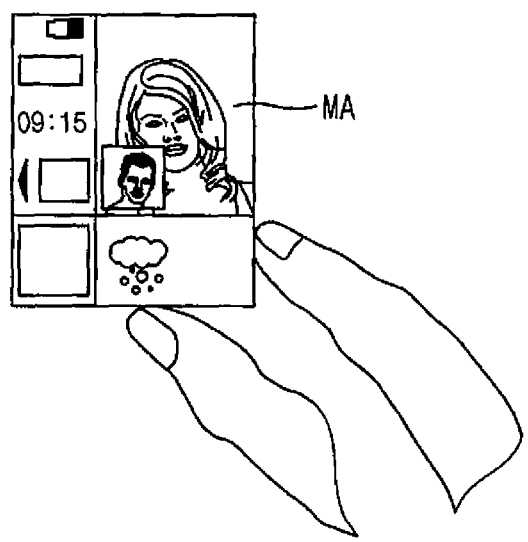

Referring to FIGS. 20 through 21E, it is illustrated that the region zooming operation is performed in the electronic device of FIG. 1. For example, as illustrated in FIG. 21A, while a display region of the front-surface touch screen 120 is divided into a left display region, a right display region, an upper display region, and a lower display region, a first division line 129-1 and a second division line 129-2 may be displayed again on the front-surface touch screen 120 when one of the left side-surface touch sensor 140-11 and the right side-surface touch sensor 140-12, and one of the upper side-surface touch sensor 140-21 and the lower side-surface touch sensor 140-22 are concurrently touched by the user for more than an activation time (e.g., a set or predetermined activation time) (S820). For example, it is illustrated in FIG. 21A that the right side-surface touch sensor 140-12 and the lower side-surface touch sensor 140-22 are concurrently touched by the user for more than the activation time. Subsequently, as illustrated in FIG. 21B, a target display region MA may be determined among divided display regions (e.g., the left display region, the right display region, the upper display region, and the lower display region) (S840) when one of the divided display regions (e.g., the target display region MA) is touched by the user. Next, as illustrated in FIGS. 21C and 21D, the target display region MA may be zoomed-in or zoomed-out as a touched point of the left side-surface touch sensor 140-11, the right side-surface touch sensor 140-12, the upper side-surface touch sensor 140-21, or the lower side-surface touch sensor 140-22 is moved by the user (S860). For example, it is illustrated in FIGS. 21C and 21D that a touched point of the right side-surface touch sensor 140-12 is moved by the user. Then, as illustrated in FIG. 21E, the region zooming operation for the target display region MA may be finished when one of the left side-surface touch sensor 140-11 and the right side-surface touch sensor 140-12, and one of the upper side-surface touch sensor 140-21 and the lower side-surface touch sensor 140-22 are concurrently touched by the user for more than a deactivation time (e.g., a set or predetermined deactivation time) (S880).

The present inventive concept may be applied to any electronic devices that include a touch screen (e.g., a watch-shaped mobile device). For example, the present inventive concept may be applied to a cellular phone, a smart phone, a smart pad, a personal digital assistant (PDA), a portable multimedia player (PMP), an MP3 player, a tablet PC, a laptop, a digital camera, a camcorder, a game console, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and features of the present inventive concept. Accordingly, all such modifications are intended to be included within the scope of the present inventive concept as defined in the claims, and equivalents thereof. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. An electronic device comprising:
a processor;
a front-surface touch screen;
a plurality of side-surface touch sensors configured to receive a user-command, wherein the plurality of side-surface touch sensors comprise a left side-surface touch sensor, a right side-surface touch sensor, an upper side-surface touch sensor and a lower side-surface touch sensor;
a body combined with the processor, the front-surface touch screen and the plurality of side-surface touch sensors with respect to a center of the body;
the processor configured to:
detect a first user-command operation comprising of at least one of the plurality of side-surface touch sensors is touched by a user for more than an activation time;
in response to detecting that one of the left side-surface touch sensor and the right side-surface touch sensor and one of the upper side-surface touch sensor and the lower side-surface touch sensor are concurrently touched by the user for more than the activation time, display on the front-surface touch screen a first pointer line extended from a first touched point of the left side-surface touch sensor or the right side-surface touch sensor and a second pointer line extended from a second touched point of the upper side-surface touch sensor or the lower side-surface touch sensor;
display a pointer at a crossing point of the first pointer line and the second pointer line on the front-surface touch screen, wherein the pointer is coupled to the crossing point of the first pointer line and the second pointer line on the front-surface touch screen;
detect a second user-command operation comprising of a touched point on the at least one of the plurality of side-surface touch sensors is moved by the user;
in response to detecting the second user-command operation, move the displayed pointer coupled to the crossing point of the first pointer line and the second pointer line on the front-surface touch screen as the first touched point and the second touched point are moved by the user;
determine that a deactivation time elapses after the first touched point and the second touched point have been moved by the user;
in response to the determination that a deactivation time has elapsed, remove from display the pointer coupled to the crossing point of the first pointer line and the second pointer line, the first pointer line and the second pointer line of the front-surface touch screen;
perform a first click operation on content displayed on the front-surface touch screen when a first region of the front-surface touch screen is touched by the user while the pointer coupled to the crossing point of the first pointer line and the second pointer line, the first pointer line and the second pointer line are displayed on the front-surface touch screen, wherein the first region comprises of a region within a reference distance from the pointer and the first click operation corresponds to a left click operation of a computer mouse device; and
perform a second click operation on content displayed on the front-surface touch screen when a second region of the front-surface touch screen is touched by the user while the pointer coupled to the crossing point of the first pointer line and the second pointer line, the first pointer line and the second pointer line are displayed on the front-surface touch screen, wherein the second region comprises of a region outside the reference distance from the pointer and the second click operation corresponds to a right click operation of the computer mouse device.

2. The electronic device of claim 1, wherein the electronic device corresponds to a watch-shaped mobile device that the user wears on a wrist.

3. The electronic device of claim 1, wherein the processor is configured to perform a drag operation on the content when the side-surface touch sensors are touched again by the user within a reactivation time after touches on the side-surface touch sensors have been released by the user, and the first touched point and the second touched point are moved while the pointer, the first pointer line, and the second pointer line are displayed on the front-surface touch screen.

4. The electronic device of claim 3, wherein the reactivation time is set to be shorter than the activation time.

5. An electronic device comprising:
a processor;
a front-surface touch screen;
a plurality of side-surface touch sensors configured to receive a user-command, wherein the plurality of side-surface touch sensors comprises of a left side-surface touch sensor, a right side-surface touch sensor, an upper side-surface touch sensor, and a lower side-surface touch sensor;
a body combined with the processor, the front-surface touch screen and the plurality of side-surface touch sensors with respect to a center of the body;
the processor configured to:
detect a first user-command operation comprising of at least one of the plurality of side-surface touch sensors is touched by a user for more than an activation time;
in response to detecting that the left side-surface touch sensor and the right side-surface touch sensor are concurrently touched by the user for more than the activation time; display, on the front-surface touch screen, a first division line coupled between a first touched point on the left side-surface touch sensor and a second touched point on the right side-surface touch sensor;

in response to detecting that the upper side-surface touch sensor and the lower side-surface touch sensor are concurrently touched by the user for more than the activation time, display, on the front-surface touch screen, a second division line coupled between a third touched point on the upper side-surface touch sensor and a fourth touched point on the lower side-surface touch sensor;

detect a second user-command operation comprising of a touched point on the at least one of the plurality of side-surface touch sensors is moved by the user;

in response to detecting that the first touched point and the second touched point are concurrently moved by the user, move the displayed first division line on the front-surface touch screen as the first touched point and the second touched point are concurrently moved by the user;

in response to detecting that the third touched point and the fourth touched point are concurrently moved by the user, move the displayed second division line on the front-surface touch screen as the third touched point and the fourth touched point are concurrently moved by the user;

determine that a deactivation time elapses after the first touched point and the second touched point have been moved by the user;

in response to the determination that a deactivation time has elapsed, remove the first division line from display on the front-surface touch screen;

determine that deactivation time elapses after the third touched point and the fourth touched point have been moved by the user;

in response to the determination that a deactivation time has elapsed, remove the second division line from display on the front-surface touch screen;

divide a display region of the front-surface touch screen into an upper display region and a lower display region by the first division line, wherein the first division line is displayed on the front-surface touch screen when the left side-surface touch sensor and the right side-surface touch sensor are concurrently touched by the user for more than the activation time;

modify the upper display region and the lower display region as the first touched point and the second touched point are moved by the user;

divide the display region of the front-surface touch screen into a left display region and a right display region by the second division line, wherein the second division line is displayed on the front-surface touch screen when the upper side-surface touch sensor and the lower side-surface touch sensor are concurrently touched by the user for more than the activation time; and rotate the left display region, the right display region, the upper display region, and the lower display region around a crossing point of the first division line and the second division line when the first touched point and the second touched point are concurrently moved by the user or the third touched point and the fourth touched point are concurrently moved by the user.

6. The electronic device of claim 5, wherein the second division line is displayed again on the front-surface touch screen when the upper side-surface touch sensor and the lower side-surface touch sensor are concurrently touched by the user for more than the activation time while the display region of the front-surface touch screen is divided into the left display region and the right display region, and wherein the left display region and the right display region are relatively adjusted as the third touched point and the fourth touched point are moved by the user.

7. The electronic device of claim 5, wherein the first division line or the second division line is partially displayed again on the front-surface touch screen when the left side-surface touch sensor, the right side-surface touch sensor, the upper side-surface touch sensor, or the lower side-surface touch sensor is touched by the user for more than the activation time while the display region of the front-surface touch screen is divided into the left display region, the right display region, the upper display region, and the lower display region, and wherein the left and right display regions or the upper and lower display regions are relatively adjusted as the first touched point, the second touched point, the third touched point, or the fourth touched point is moved by the user.

8. The electronic device of claim 5, wherein a target display region is determined when one of the left display region, the right display region, the upper display region, and the lower display region is touched by the user after one of the left side-surface touch sensor and the right side-surface touch sensor, and one of the upper side-surface touch sensor and the lower side-surface touch sensor have been concurrently touched by the user for more than the activation time while the display region of the front-surface touch screen is divided into the left display region, the right display region, the upper display region, and the lower display region, and wherein the target display region is zoomed-in or zoomed-out as the first touched point, the second touched point, the third touched point, or the fourth touched point is moved by the user.

* * * * *